United States Patent
Nabeshima et al.

(10) Patent No.: US 12,395,745 B2
(45) Date of Patent: Aug. 19, 2025

(54) IMAGE PROCESSING APPARATUS AND METHOD, AND IMAGE CAPTURING APPARATUS

(71) Applicant: CANON KABUSHIKI KAISHA, Tokyo (JP)

(72) Inventors: Takuya Nabeshima, Kanagawa (JP); Takenori Kobuse, Kanagawa (JP); Takahiro Kamikura, Tokyo (JP); Shigeharu Aoki, Kanagawa (JP); Kento Watanabe, Kanagawa (JP); Daisuke Higuchi, Osaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 18/408,905

(22) Filed: Jan. 10, 2024

(65) Prior Publication Data

US 2024/0147080 A1 May 2, 2024

Related U.S. Application Data

(63) Continuation of application No. PCT/JP2022/022948, filed on Jun. 7, 2022.

(30) Foreign Application Priority Data

Jul. 12, 2021 (JP) .................. 2021-115147

(51) Int. Cl.
*H04N 23/76* (2023.01)
*G06T 5/40* (2006.01)
(Continued)

(52) U.S. Cl.
CPC .............. *H04N 23/76* (2023.01); *G06T 5/40* (2013.01); *G06T 7/12* (2017.01); *H04N 23/71* (2023.01);
(Continued)

(58) Field of Classification Search
CPC ...... H04N 23/71; H04N 23/741; H04N 23/76; H04N 23/81; H04N 23/84; H04N 25/11;
(Continued)

(56) References Cited

U.S. PATENT DOCUMENTS

2015/0381871 A1* 12/2015 Makino ................ H04N 23/951
348/335
2017/0372501 A1* 12/2017 Ishimatsu ............ G06V 10/147
(Continued)

FOREIGN PATENT DOCUMENTS

JP 2015-109625 A 6/2015
JP 2017-212678 A 11/2017
(Continued)

OTHER PUBLICATIONS

The International Search Report dated Aug. 2, 2022 of PCT/JP2022/022948, which is enclosed.

*Primary Examiner* — Daniel M Pasiewicz
(74) *Attorney, Agent, or Firm* — Cowan, Liebowitz & Latman, P.C.

(57) ABSTRACT

In an image processing apparatus, an image signal of a plurality of polarized lights is input, for each set of image signals corresponding to the polarized lights, a maximum value of polarization intensities of polarization components of the image signals and a polarization angle at which the maximum value of the polarization intensities is obtained are found, and a target area to which polarization reduction is to be applied is found based on the image signal and a statistical area is set in the target area. Representative intensity and angle which are modes of the polarization intensities and angles of the sets included in the statistical area are found, and first correction processing for correcting each image signal of the sets included in the target area is
(Continued)

performed using the representative intensity and angle according to the polarization angle of the each image signal.

24 Claims, 34 Drawing Sheets

(51) Int. Cl.
 *G06T 7/12* (2017.01)
 *H04N 23/71* (2023.01)
 *H04N 23/741* (2023.01)
 *H04N 23/81* (2023.01)
 *H04N 23/84* (2023.01)
 *H04N 25/11* (2023.01)
 *H04N 25/13* (2023.01)

(52) U.S. Cl.
 CPC ........... *H04N 23/741* (2023.01); *H04N 23/81* (2023.01); *H04N 23/84* (2023.01); *G06T 2207/10024* (2013.01); *G06T 2207/20021* (2013.01); *G06T 2207/20192* (2013.01); *H04N 25/11* (2023.01); *H04N 25/134* (2023.01)

(58) Field of Classification Search
 CPC ........... H04N 25/134; G06T 5/40; G06T 7/12; G06T 2207/10024; G06T 2207/20021; G06T 2207/20192
 See application file for complete search history.

(56) References Cited

U.S. PATENT DOCUMENTS

| | | | |
|---|---|---|---|
| 2021/0152748 A1* | 5/2021 | Lu | H04N 23/75 |
| 2021/0195080 A1* | 6/2021 | Kobuse | H04N 23/73 |
| 2021/0201450 A1* | 7/2021 | Kurita | G06T 7/40 |
| 2021/0271061 A1* | 9/2021 | Fukazawa | A61B 1/045 |

FOREIGN PATENT DOCUMENTS

| | | |
|---|---|---|
| JP | 2017-228910 A | 12/2017 |
| JP | 2020-048140 A | 3/2020 |
| JP | 2021-097348 A | 6/2021 |

* cited by examiner

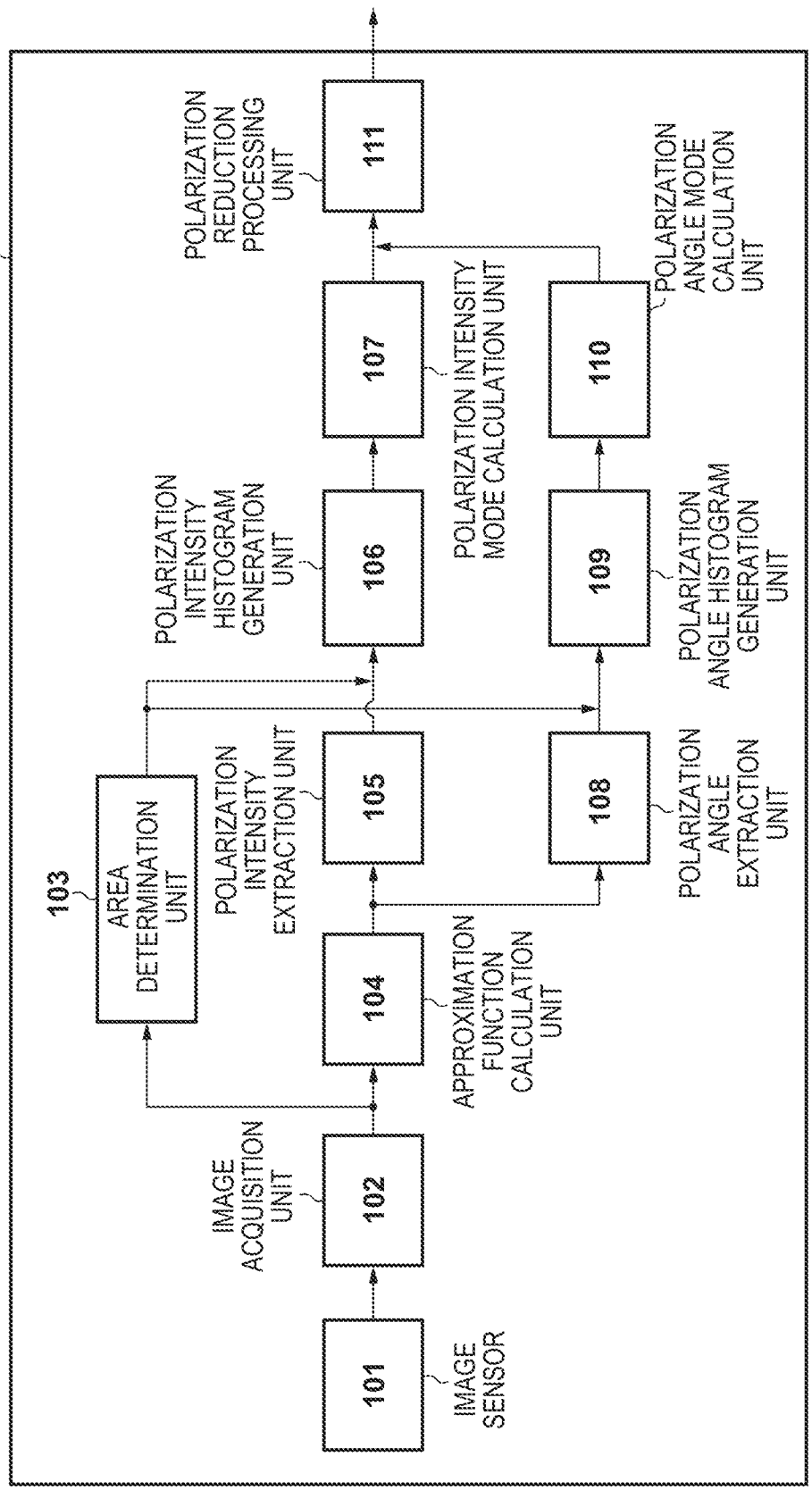

F I G. 6A
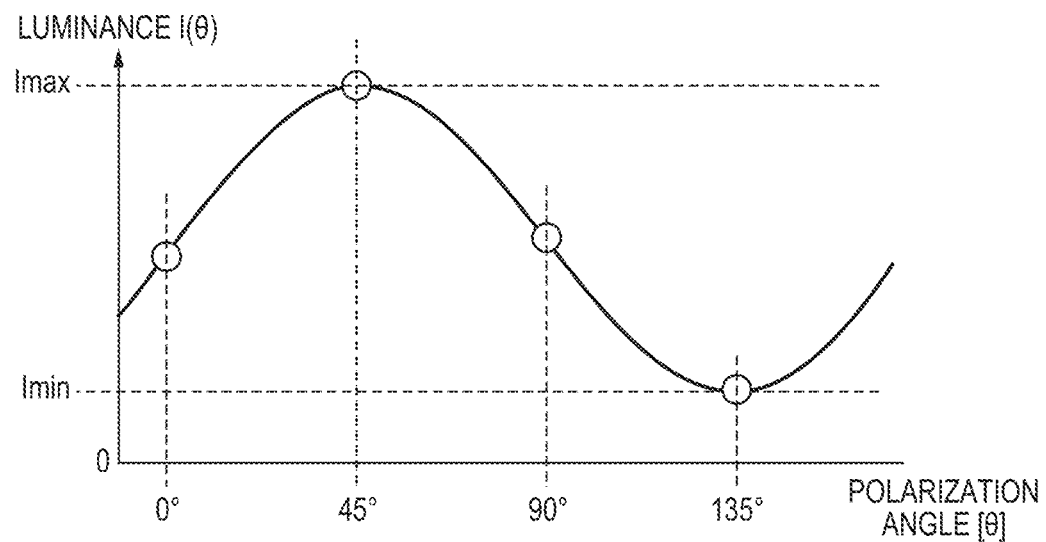
F I G. 6B
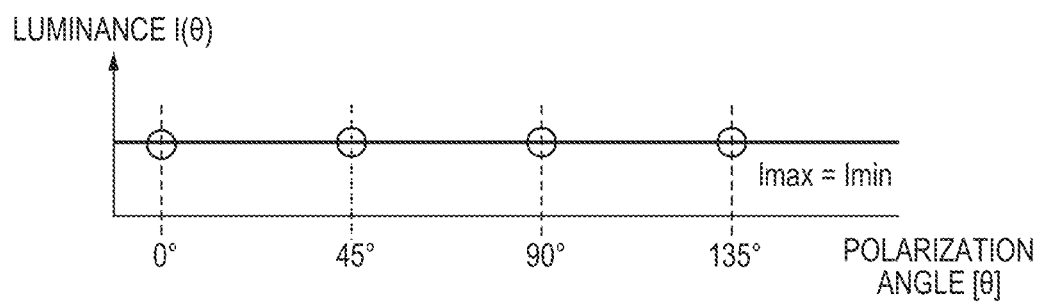

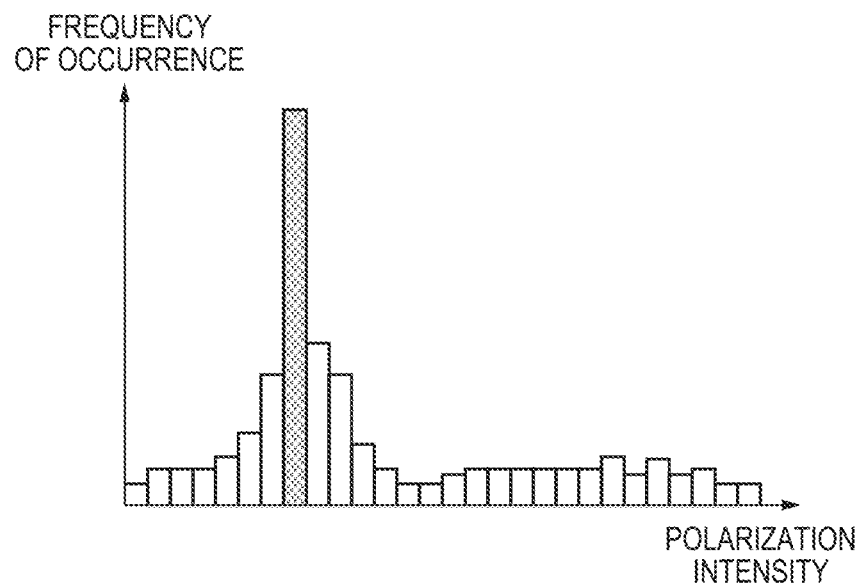

IMAGE PROCESSING APPARATUS AND METHOD, AND IMAGE CAPTURING APPARATUS

CROSS-REFERENCE TO RELATED APPLICATIONS

This application is a Continuation of International Patent Application No. PCT/JP2022/022948, filed Jun. 7, 2022, which claims the benefit of Japanese Patent Application No. 2021-115147, filed Jul. 12, 2021, both of which are hereby incorporated by reference herein in their entirety.

BACKGROUND OF THE INVENTION

Field of the Invention

The present invention relates to an image processing apparatus and method, and an image capturing apparatus, and more particularly to a technique for processing an image signal generated by photoelectric conversion of plural kinds of polarized light having different polarization angles.

Background Art

Conventionally, a plurality of light receiving elements (pixels) are arranged in an image sensor represented by a CCD (Charge Coupled device) or a CMOS (Complementary Metal Oxide Semiconductor) sensor. Then, by converting light into electricity in each pixel, the intensity (luminance) of light can be detected. Further, by arranging a color filter which mainly passes light in any of the wavelength bands of red (R), green (G), and blue (B) in each pixel, only the intensity of light having wavelengths (colors) of visible light can be detected. By using such a mechanism, it becomes possible to record a visible light subject as an image signal (electrical signal) in a storage device or display it on a display device.

Light has a property called polarization in addition to properties such as luminance and color. Polarization can be considered as the vibration direction of light, and it is known that light emitted from a light source is to have various vibration direction components (polarization direction) when reflected by a subject. However, in reality, since the light that reaches the eyes is mixture of the polarized light and the unpolarized light, it is not possible to distinguish the component (polarized component) of the polarized light.

On the other hand, it is generally known that by utilizing this property of polarization, it is possible to emphasize desired reflected light and remove undesired reflected light. For example, reducing an image reflected on a water surface or a glass surface using a polarized light (PL) filter is often used as a shooting technique. Various applications are expected in the future as a method of utilizing light properties different from the conventional ones, such as creating a contrast effect by suppressing undesired reflected light and visualizing the stress applied to an object using the polarization intensity.

Japanese Patent Laid-Open No. 2017-228910 proposes a technique for generating an output image corresponding to polarized light having a desired polarization angle by using the luminance values of a plurality of polarized images obtained by photoelectric conversion of light having different polarization angles. In this technique, an approximation function of a luminance component (polarization component) that changes according to the polarization angle is obtained, a polarization component at a specific polarization angle is obtained based on the obtained approximation function, and an output image corresponding to the polarized light having a desired polarization angle is generated. By using this technique, the polarization angle of the output image can be adjusted arbitrarily.

Further, Japanese Patent Laid-Open No. 2017-228910 shows as an example, as a method of acquiring a plurality of polarized images, that a polarizing element array in which a plurality of sets each including four polarizing elements having different polarization directions are arranged is integrally provided in an image sensor, and four images of light having different polarization angles are generated from an output image signal.

However, when the technique of Japanese Patent Laid-Open No. 2017-228910 is used to acquire images of light with different polarization angles using the above-mentioned polarizing element array and remove the polarization component of an arbitrary polarization angle, there are the following problems. That is, since the minimum luminance value of the approximation function is applied to the image signal of 4 pixels corresponding to each set of the polarizing elements used when obtaining the approximation function, the resolution after the polarization reduction processing is lowered.

For example, when shooting a subject in a car as shown in FIG. 35A, a situation in which the windshield reflects light and the inside of the car cannot be shot at a certain polarization angle as shown in the region 3501 in FIG. 35B is assumed. In this case, it is possible to remove the reflected light by capturing an image using an image sensor provided with a polarizing element array and performing a polarization reduction processing on the captured image, however, the resolution is lowered.

In addition, if the image signal of four pixels used to obtain the approximation function contains an edge component, the approximation function cannot be obtained correctly in the first place, so it is not possible to remove the polarization component from the image signal containing the edge component.

The present invention has been made in consideration of the above problems, and enables more accurate polarization reduction processing by using a plurality of image signals corresponding to light having different polarization characteristics obtained in one shot.

SUMMARY OF THE INVENTION

According to the present invention, provided is an image processing apparatus comprising one or more processors and/or circuitry which function as: an input unit that inputs an image signal generated by photoelectrically converting a plurality of polarized lights with different polarization angles from each other; a first processing unit that finds, for each set of a plurality of image signals corresponding to the polarized lights, a maximum value of polarization intensities of polarization components of the plurality of image signals and a polarization angle at which the maximum value of the polarization intensities is obtained; a setting unit that finds a target area to which polarization reduction is to be applied based on the image signal and sets a statistical area, included in the target area, for taking statistics; a second processing unit that finds a representative intensity which is a mode of the polarization intensities and a representative angle which is a mode of pluralization angles of the sets included in the statistical area; and a correction unit that performs first correction processing for correcting each image signal of the sets included in the target area using the representative intensity and the representative angle according to the polarization angle of the each image signal.

Further, according to the present invention, provided is an image capturing apparatus comprising: an image sensor, having a plurality of polarizing filters that pass a plurality of polarized lights with different polarization angles each other, that generates an image signal generated by photoelectrically converting the plurality of polarized lights; and an image processing apparatus comprising one or more processors and/or circuitry which function as: an input unit that inputs the image signal from the image sensor; a first processing unit that finds, for each set of a plurality of image signals corresponding to the polarized lights, a maximum value of polarization intensities of polarization components of the plurality of image signals and a polarization angle at which the maximum value of the polarization intensities is obtained; a setting unit that finds a target area to which polarization reduction is to be applied based on the image signal and sets a statistical area, included in the target area, for taking statistics; a second processing unit that finds a representative intensity which is a mode of the polarization intensities and a representative angle which is a mode of pluralization angles of the sets included in the statistical area; and a correction unit that performs first correction processing for correcting each image signal of the sets included in the target area using the representative intensity and the representative angle according to the polarization angle of the each image signal.

Furthermore, according to the present invention, provided is an image processing method comprising: inputting an image signal generated by photoelectrically converting a plurality of polarized lights with different polarization angles from each other; finding, for each set of a plurality of image signals corresponding to the polarized lights, a maximum value of polarization intensities of polarization components of the plurality of image signals and a polarization angle at which the maximum value of the polarization intensities is obtained; finding a target area to which polarization reduction is to be applied based on the image signal and setting a statistical area, included in the target area, for taking statistics; finding a representative intensity which is a mode of the polarization intensities and a representative angle which is a mode of pluralization angles of the sets included in the statistical area; and performing first correction processing for correcting each image signal of the sets included in the target area using the representative intensity and the representative angle according to the polarization angle of the each image signal.

Further, according to the present invention, provided is a non-transitory computer-readable storage medium, the storage medium storing a program that is executable by the computer, wherein the program includes program code for causing the computer to function as an image processing apparatus comprising: an input unit that inputs an image signal generated by photoelectrically converting a plurality of polarized lights with different polarization angles from each other; a first processing unit that finds, for each set of a plurality of image signals corresponding to the polarized lights, a maximum value of polarization intensities of polarization components of the plurality of image signals and a polarization angle at which the maximum value of the polarization intensities is obtained; a setting unit that finds a target area to which polarization reduction is to be applied based on the image signal and sets a statistical area, included in the target area, for taking statistics; a second processing unit that finds a representative intensity which is a mode of the polarization intensities and a representative angle which is a mode of pluralization angles of the sets included in the statistical area; and a correction unit that performs first correction processing for correcting each image signal of the sets included in the target area using the representative intensity and the representative angle according to the polarization angle of the each image signal.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a block diagram showing a functional configuration of an image capturing apparatus according to first to fourth, sixth, and eighth to tenth embodiments of the present invention.

FIG. 6A is a graph showing an approximation function of a polarization component according to the first embodiment.

FIG. 6B is a graph showing an approximation function of a polarization component according to the first embodiment.

FIG. 8A is a diagram showing an example of a histogram showing the frequency of occurrence with respect to the polarization intensity according to the first to fourth embodiments.

FIG. 8B is a diagram showing an example of a histogram showing the frequency of occurrence with respect to a polarization angle according to the first to fourth embodiments.

DESCRIPTION OF THE EMBODIMENTS

Figure 2A:
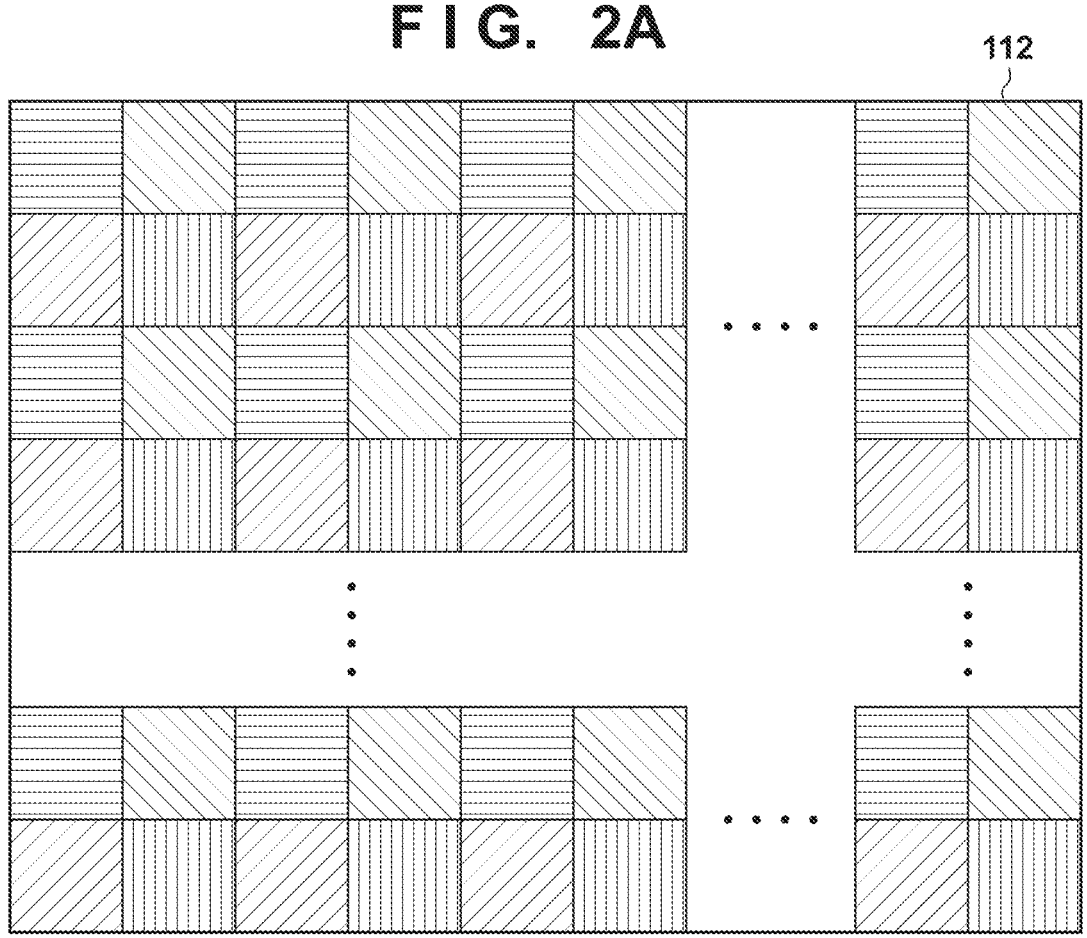
FIG. 2A is a diagram showing an example of an arrangement of a polarizing filter in the embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A first embodiment of the present invention will be described.

FIG. 1 is a block diagram showing a functional configuration of an image capturing apparatus 100 according to the first embodiment to which the image processing apparatus of the present invention is applied, and shows only functions related to polarization component reduction processing (correction processing). The image capturing apparatus 100 is an example of an apparatus capable of inputting an image, reducing an arbitrary polarization component from the input image, and outputting the resultant image.

An image sensor 101 has a photoelectric conversion unit that converts incident light into an analog electrical signal, and an A/D conversion unit that converts the converted analog signal into a digital signal. Further, on the imaging surface of the image sensor 101, a plurality of polarizing filters having different polarization directions are arranged on respective pixels.

Here, the arrangement of the polarizing filters on a pixel unit 112 of the image sensor 101 used in the present embodiment will be described with reference to FIGS. 2A and 2B. As shown in FIG. 2A, the image sensor 101 includes a polarizing filter provided on each pixel. Further, a polarizing filter provided on a pixel has a different polarization direction from polarizing filters provided on its adjacent pixels, and thus the adjacent pixels can photoelectrically convert polarized light having different polarization directions. Hereinafter, the pixel unit 112 in which the polarizing filters are arranged in this way is referred to as an "on-imaging surface polarizing sensor 112".

Figure 2B:
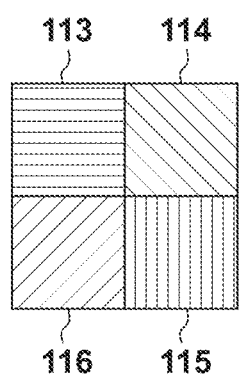
FIG. 2B is a diagram showing an example of the arrangement of the polarizing filter in the embodiment.

As shown in FIG. 2B, on the on-imaging surface polarizing sensor 112, four types of polarizing filters having different polarization directions by 45° are arranged on a set of four pixels. As an example, a polarizing filter 113 having a polarization angle of 0°, a polarizing filter 114 having a polarization angle of 45°, a polarizing filter 115 having a polarization angle of 90°, and a polarizing filter 116 having a polarization angle of 135° are arranged. Hereinafter, the set of 4 pixels will be referred to as a "local-four-pixel set". A large number of local-four-pixel sets are periodically arranged on the on-imaging surface polarizing sensor 112 as shown in FIG. 2A.

With such a configuration, it is possible to always photoelectrically convert polarized light polarized in a plurality of different directions at the same timing and acquire the signals of light with different polarization directions as an image of the same frame. In the case of this image sensor 101, it becomes possible to acquire an image based on polarized light of four different polarization directions in one shooting. As described above, by using the on-imaging surface polarizing sensor 112 on which the polarizing filters shown in FIGS. 2A and 2B are arranged, it becomes unnecessary to perform such operations as to place multiple polarizing filters having polarization characteristics with different polarization directions in front of the lens and to move them manually or automatically in order to obtain images based on polarized light having different polarization directions.

Figure 3A:
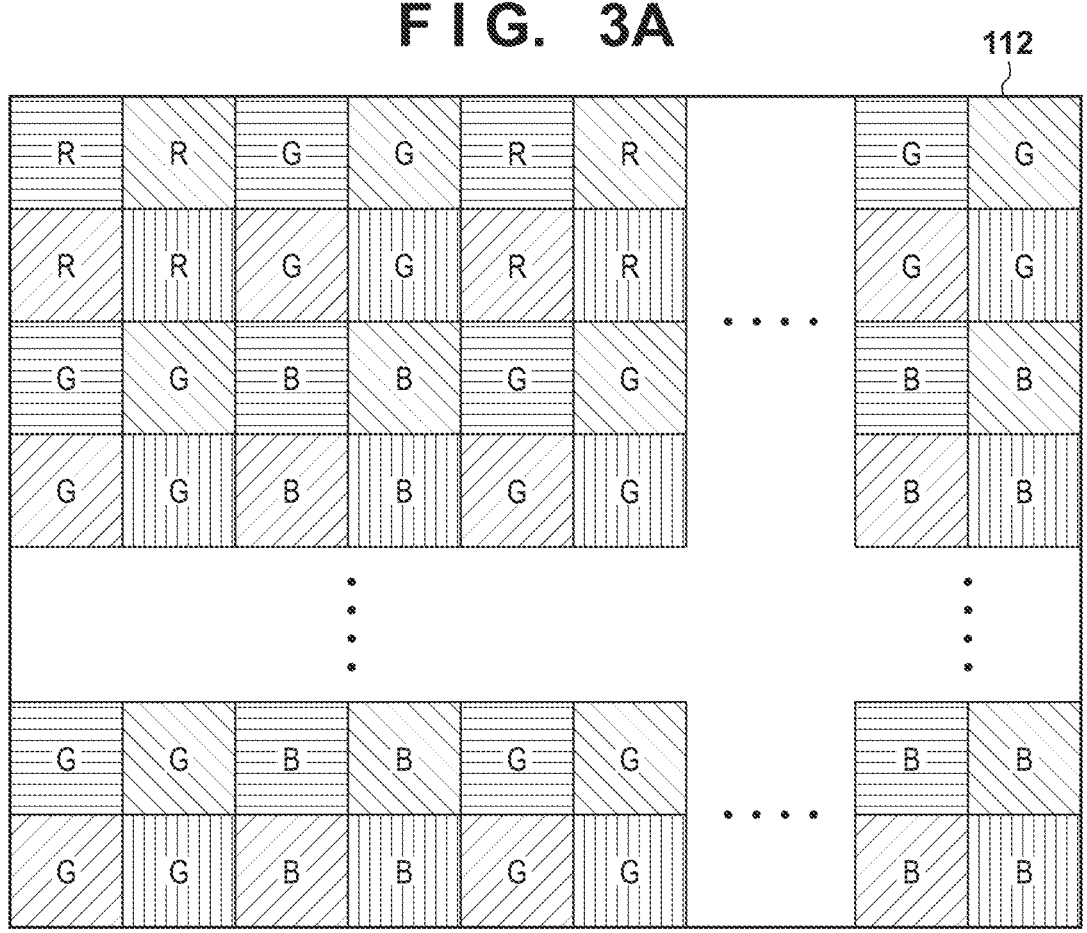
FIG. 3A is a diagram showing an example of an arrangement of a color filter and a polarizing filter in the embodiment.
Figure 3B:
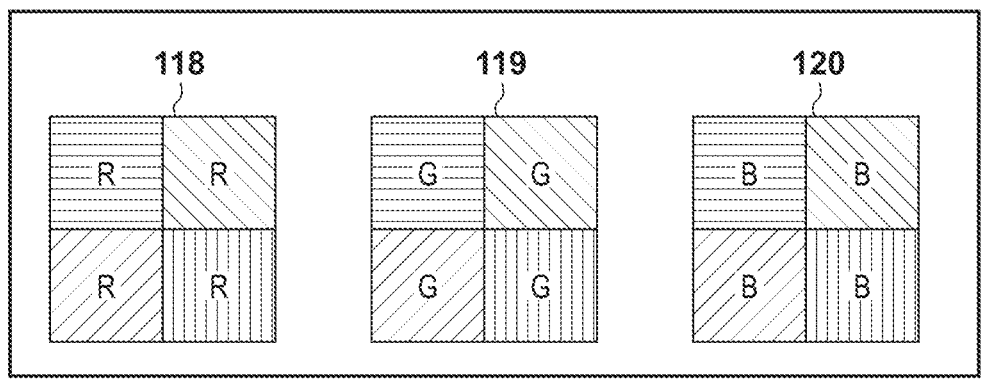
FIG. 3B is a diagram showing an example of the arrangement of the color filter and the polarizing filter in the embodiment.

If the on-imaging surface polarizing sensor 112 does not have a spectroscopic function realized by a color filter, for example, the obtained image will be a monochromatic image, but as shown in FIGS. 3A and 3B, by arranging color filters so that a color filter of the same color is provided for every local-four-pixel set, it is possible to obtain a color image. Here, as shown in FIG. 3B, a case where the local-four-pixel set covered by a red (R) color filter 118, the local-four-pixel set covered by a green (G) color filter 119, and the local-four-pixel set covered by a blue (B) color as shown in FIG. 3B are arranged in a Bayer pattern as shown in FIG. 3A is shown.

FIGS. 2A, 2B, 3A and 3B show examples of the on-imaging surface polarizing sensor 112 constituting the image sensor 101, and the arrangement of the polarizing filters and the polarization directions may be arbitrarily set. Further, an arrangement in which part of pixels are provided with polarizing filters, and part of pixels are not provided with polarizing filters may be also conceivable.

Figure 4:
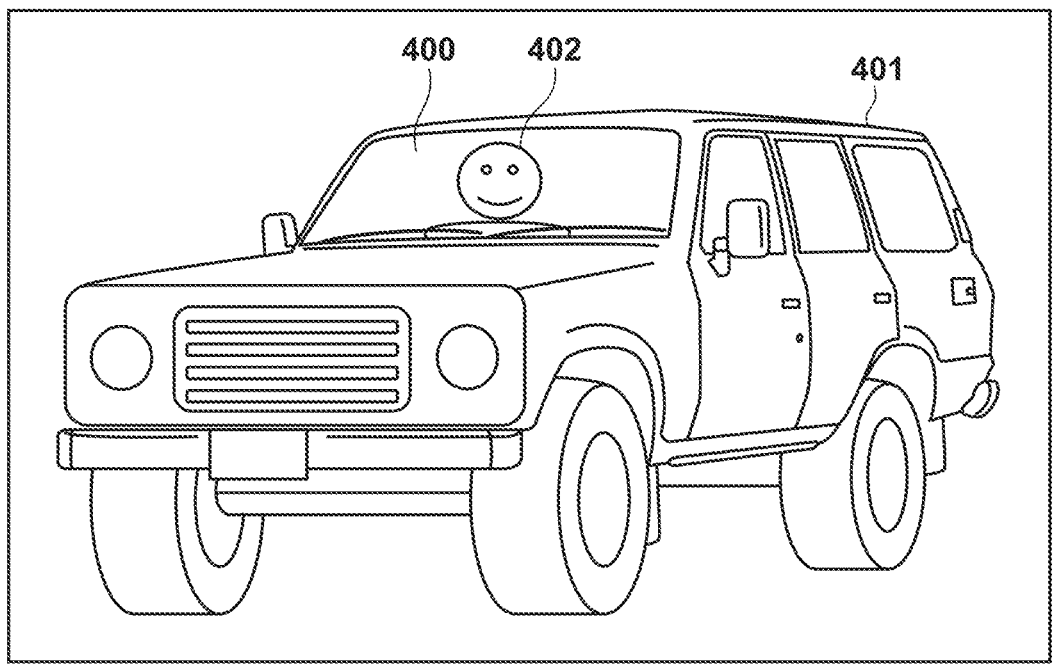
FIG. 4 is a diagram showing an example of a subject according to the first embodiment.

Here, the relationship between the polarization directions of polarized light and the brightness of an output image signal will be described by taking as an example the case where a subject shown in FIG. 4 is shot. From the image signal of one image obtained by shooting with the on-imaging surface polarizing sensor 112, by extracting only the signal of the pixels on which the polarizing filters of a certain polarization direction are arranged and generating one image, it is possible to obtain an image of polarized light having the same polarization direction as the polarizing filter. By performing this operation for each of the polarizing filters 113 to 116, four kinds of images of four polarization directions can be obtained.

FIG. 4 shows a subject in which a person 402 is in a car 401, and an area 400 is a windshield of the car. Here, it is assumed that the reflected light in the area 400 becomes large. The details of the polarization characteristics of the reflected light will be described later.

Figure 5A:
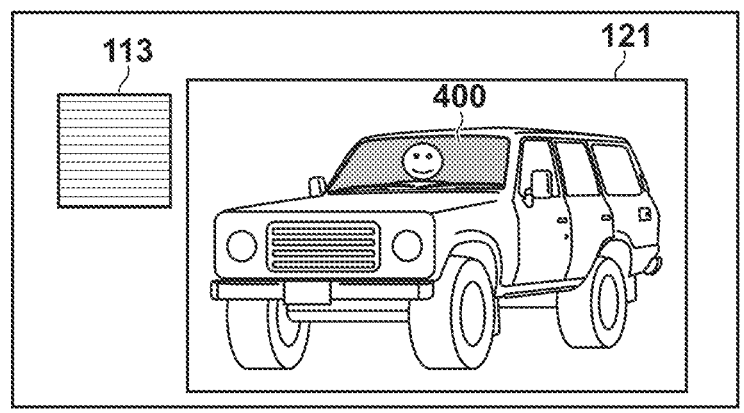
FIG. 5A is a diagram showing an example of an image generated for one of different polarization directions when the subject shown in FIG. 4 is shot.
Figure 5B:
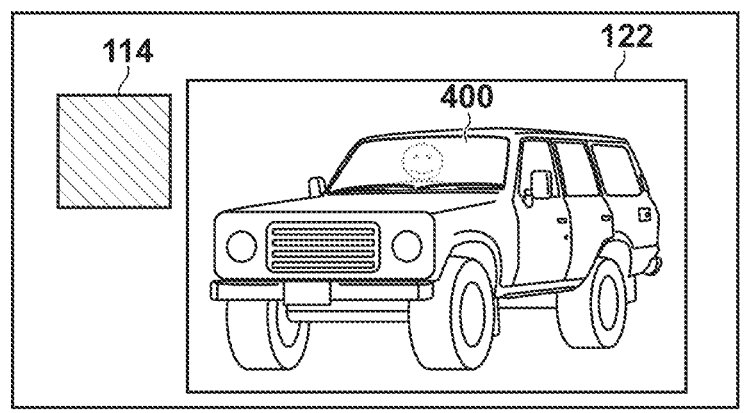
FIG. 5B is a diagram showing an example of an image generated for another of the different polarization directions when the subject shown in FIG. 4 is shot.
Figure 5C:
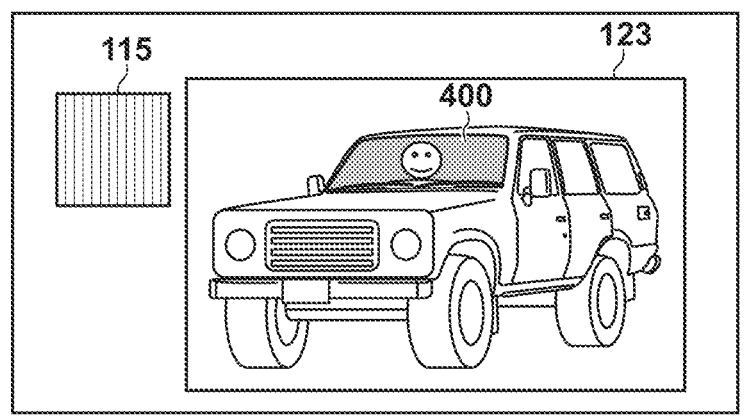
FIG. 5C is a diagram showing an example of an image generated for another of the different polarization directions when the subject shown in FIG. 4 is shot.
Figure 5D:
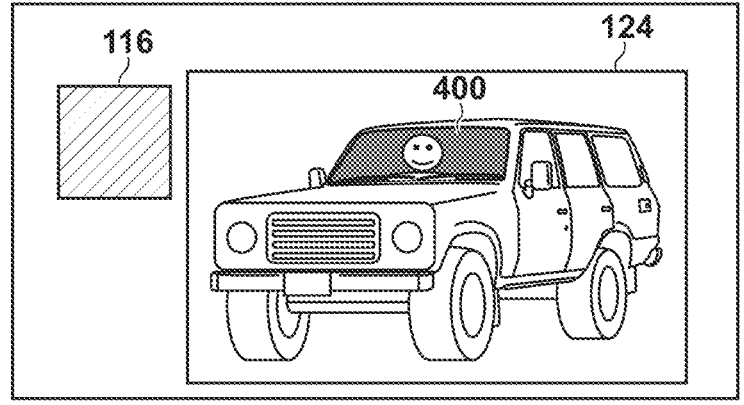
FIG. 5D is a diagram showing an example of an image generated for another of the different polarization directions when the subject shown in FIG. 4 is shot.

FIGS. 5A to 5D show an example of four polarized images obtained by separating the image signal obtained from the image sensor 101 for each polarization direction. FIG. 5A shows a polarized image 121 generated from an image signal output only from pixels on which the polarizing filter 113 with the polarization angle of 0° shown in FIGS. 2A and 2B is arranged. FIG. 5B shows a polarized image 122 generated from an image signal output only from pixels on which the polarizing filter 114 with the polarization angle of 45° is arranged. FIG. 5C shows a polarized image 123 generated from an image signal output only from pixels on which the polarizing filter 115 with the polarization angle of 90° is arranged. Further, FIG. 5D shows a polarized image 124 generated from an image signal output only from pixels on which the polarizing filter 116 with the polarization angle of 135° is arranged. In FIGS. 5A to 5D, it is expressed that an area where the light reflected from the subject passes through the polarizing filter is bright, and an area where the light reflected from the subject is blocked by the polarizing filter is dark.

Here, since the polarizing filter 114 with the polarization angle of 45° transmits the reflected light from the windshield most, the area 400 shown in FIG. 5B is expressed brightly. Further, since the polarizing filter 116 with the polarization angle of 135° blocks the reflected light from the windshield most, the area 400 shown in FIG. 5D is expressed darkly. Furthermore, since the amount of reflected light transmitted through the polarizing filter 113 with the polarization angle of 0° and the polarizing filter 115 with the polarization angle of 90° is between those through the polarizing filter 114 and the polarizing filter 116, the areas 400 shown in FIGS. 5A and 5C are expressed with medium brightness.

In addition, the area where the brightness does not change in the images of the polarized light in the four directions, that is, the area other than the area 400, is a non-polarized area where the light is not polarized. That is, since the polarization angle cannot be adjusted in the non-polarized area, the magnitude of the reflected light can be adjusted only in the area 400 in the example of the subject shown in FIG. 4.

A digital signal (image signal) generated by the on-imaging surface polarizing sensor 112 in the image sensor 101 is input to an image acquisition unit 102. The image acquisition unit 102 receives an image signal from the image sensor 101 and outputs it to an area determination unit 103 and an approximation function calculation unit 104.

The area determination unit 103 aggregates the polarization characteristics acquired using the local-four-pixel sets when performing polarization reduction processing, which will be described later, on the image signal input from the image acquisition unit 102, and determines the range (statistical area) for creating a histogram. For example, if a difference between the maximum and minimum values of the four image signals (luminance values) output from each local-four-pixel set is greater than or equal to a predetermined threshold, the local-four-pixel set is determined to belong to a target area for polarization reduction (hereinafter referred to as "polarization reduction target area"). Then, an area formed by collecting mutually adjacent local-four-pixel sets determined to belong to the polarization reduction target area is defined as the polarization reduction target area. The area determination unit 103 determines the thus obtained polarization reduction target area as a statistical area. Note that an area narrower than the polarization reduction target area may be determined as the statistical area.

The approximation function calculation unit 104 calculates polarization characteristics of polarized light for every local-four-pixel set from the image signal acquired by the image acquisition unit 102. Here, a method for determining polarization characteristics will be explained.

FIG. 6A is a graph of an approximation function $F(\theta)$ representing polarization characteristics in arbitrary local-four-pixel set within the area 400. In this embodiment, the component of luminance $I(\theta)$ that changes for each polarization angle $\theta$ is called a "polarization component". When the luminances $I(\theta)$ at polarization angles 0°, 45°, 90°, and 135° are acquired from the image obtained from the image acquisition unit 102, and the acquired luminances $I(\theta)$ are plotted for polarization angle $\theta$, the luminance $I(\theta)$ can be approximated by a sine function or a cosine function with a period of 180°. That is, the approximation function $F(\theta)$ can be obtained. Note that in this embodiment, the luminances of four polarization angles are used as the polarizing filters 113 to 116 shown in FIGS. 2A and 2B are used, but if luminances of three or more polarization angles are known, it is possible to generate the approximation function F(θ) of the polarization component.

The approximation function F(θ) of the polarization component can be expressed by Equation (1).

$$F(\theta)=A\cos(2\theta+2B)+C \qquad (1)$$

In Equation (1), A represents a polarization intensity of the polarization component, B represents an polarization angle of the polarization component, and C represents an offset component. In the approximation function F(θ), the polarization component becomes the smallest at the point at which the minimum luminance Imin is reached, so it represents the luminance of only the non-polarization component. By finding this approximation function F(θ), it becomes possible to adjust the polarization angle θ so that the magnitude of the reflected light becomes a desired magnitude.

In the example of this embodiment shown in FIG. 6A, the polarization component in the area 400 has the maximum luminance Imax when the polarization angle is 45° and the minimum luminance Imin when the polarization angle is 135°, as described above.

FIG. 6B shows the polarization component (non-polarization component) of the non-polarization area excluding the area 400 in FIGS. 5A to 5D, and the polarization component becomes 0 at all polarization angles θ. In reality, there are few scenes in which the polarization component is completely 0, but in this embodiment, for convenience of explanation, the polarization component is described as 0.

A polarization intensity extraction unit 105 extracts intensity information (polarization intensity) of the polarization component using the approximation function F(θ) of the polarization component found by the approximation function calculation unit 104, and outputs it to a polarization intensity histogram generation unit 106. The polarization intensity refers to the amplitude of the approximation function F(θ), and the polarization intensity changes depending on the luminance of the polarized light.

The polarization intensity histogram generation unit 106 aggregates the polarization intensity of every local-four-pixel set extracted by the polarization intensity extraction unit 105 within the area determined by the area determination unit 103, and creates a histogram of frequency of occurrence.

A polarization intensity mode calculation unit 107 calculates the polarization intensity (representative intensity) that is the mode in the histogram generated by the polarization intensity histogram generation unit 106, and outputs it to a polarization reduction processing unit 111.

On the other hand, a polarization angle extraction unit 108 extracts angle information (polarization angle) of the polarization component using the approximation function F(θ) of the polarization component calculated by the approximation function calculation unit 104, and outputs it to a polarization angle histogram generation unit 109. The polarization angle refers to the angle at which the approximation function F(θ) exhibits the maximum luminance Imax.

The polarization angle histogram generation unit 109 aggregates the polarization angles for every local-four-pixel set extracted by the polarization angle extraction unit 108 within the statistical area determined by the area determination unit 103, and creates a histogram of occurrence frequency.

A polarization angle mode calculation unit 110 calculates the polarization angle (representative angle) that is the mode in the histogram generated by the polarization angle histogram generation unit 109, and outputs it to the polarization reduction processing unit 111.

The polarization reduction processing unit 111 uses the mode of polarization intensity obtained by the polarization intensity mode calculation unit 107 and the mode of polarization angle obtained by the polarization angle mode calculation unit 110 to determine the representative polarization characteristic in the statistical area. Then, the polarization component at each angle (here, 0°, 45°, 90°, and 135°) is calculated from the determined representative polarization characteristic, and the polarization component is subtracted from each luminance value. For example, in Equation (1), by substituting the mode Imode of polarization intensity to A, the mode θmode of polarization angle to B, and each angle to θ, an approximation function of the polarization component shown in Equation (2) below can be obtained. Then, by substituting each polarization angle into the following Equation (2), the polarization component of each polarization angle is determined.

$$F(\theta)=I\text{mode}\times\cos(2\theta+2\theta\text{mode})+C \qquad (2)$$

The polarization component can be reduced by subtracting the obtained polarization component from the luminance I(θ) obtained from each pixel in the polarization reduction target area.

Next, with reference to the flowchart in FIG. 7, the reduction process of the polarization component and the reason why the polarization component can be appropriately reduced and a polarization reduced image with resolution being maintained can be generated even in a case where the polarization component overlaps with the edge of the person inside the car will be explained. Hereinafter, an edge of a non-polarization component such as a person in a car will be referred to as an "edge of a non-polarization component", and an edge of a polarization component such as reflected light will be referred to as an "edge of a polarization component".

First, in step S101, an image signal is acquired from the on-imaging surface polarizing sensor 112. In step S102, the approximation function calculation unit 104 finds the approximation function F(θ) of the polarization component for each local-four-pixel set based on the image signal acquired from the image acquisition unit 102. Similar approximation functions F(θ) of this polarization component are found in regions having the same polarization characteristics. However, as shown in FIG. 4, if there is an edge of a non-polarization component such as a person behind the reflective windshield, the polarization characteristic represented by the approximation function F(θ) obtained for the local-four-pixel set including the edge of a non-polarization component within the area 400 is different from the actual polarization characteristic. On the other hand, the approximation function F(θ) obtained for the local-four-pixel set that does not include the edge of the person in the area 400 is an approximation function that shows correct polarization characteristics.

In step S103, the polarization intensity extraction unit 105 and polarization angle extraction unit 108 calculate polarization intensity and polarization angle, respectively, from the approximation function F(θ) of the polarization component obtained for each local-four-pixel set by the approximation function calculation unit 104.

In step S104, when the polarization reduction processing unit 111 removes the polarization component, a plurality of polarization characteristics are used, and a statistical area for acquiring the polarization characteristics is determined. As described above, for example, the statistical area may be the polarization reduction target area (for example, the area 400) from which the polarization component is to be removed, or it may be a narrower area within the polarization reduction target area.

In step S105, the polarization intensity and polarization angle obtained in step S103 are aggregated for each statistical area determined by the area determination unit 103 in step S104. Then, the polarization intensity histogram generation unit 106 and polarization angle histogram generation unit 109 create histograms of occurrence frequency using the aggregated polarization intensity and polarization angle, respectively.

In step S106, the polarization angle mode calculation unit 110 and the polarization intensity mode calculation unit 107 obtain the modes (representative intensity and representative angle) in the histograms of polarization intensity and polarization angle, respectively, created in step S105, and the modes are dealt with as the representative polarization characteristics of the statistical area.

If an area that includes the edge of the person in the area 400 is focused, the approximation function F(θ) obtained from the local-four-pixel set with no edge of a non-polarization component behind the windshield will be the function that represents the correct polarization characteristics, and this polarization characteristic becomes the most abundant component in the statistical area. On the other hand, different approximation functions F(θ) may be obtained for a local-four-pixel set that include an edge of a non-polarization component depending on the angle and contrast of edge, different from the approximation function F(θ) obtained for a local-four-pixel set that does not include an edge. Therefore, the histogram generated for this region will be a histogram in which correct polarization characteristics and randomly distributed polarization characteristics due to edges are mixed, as shown in FIGS. 8A and 8B. Therefore, by finding the modes of polarization intensity and polarization angle in the statistical area from the created histogram and using them as representative polarization characteristics, the influence of edge components can be removed.

In step S107, the polarization component of each polarization angle is calculated as explained with reference to equation (2) using the representative polarization characteristics obtained in step S106, and the polarization component is reduced by subtracting the polarization component from the luminance value of each pixel.

As described above, according to the first embodiment, the polarization component reduction processing (correction processing) is performed on all pixels within the polarization reduction target area using the representative polarization characteristics of the corresponding statistical area. As a result, by applying the polarization characteristics that are not affected by edges even to the local-four-pixel set in which polarization characteristics that are affected by edges as the local-four-pixel set that includes edges, it becomes possible to more accurately reduce the polarization component. Furthermore, by subtracting an appropriate amount of polarization component with respect to the polarization angle of each polarizing filter from the luminance value of each pixel, it is possible to reduce the polarization component without reducing resolution.

Second Embodiment

Next, a second embodiment of the present invention will be described.

In the first embodiment described above, by calculating the representative polarization characteristics in the statistical area and subtracting a more appropriate amount of polarization component with respect to each polarization angle from the luminance values of pixels in the corresponding polarization reduction target area, the polarization component is reduced while maintaining resolution. However, as in the subject shown in FIG. 9, the light reflected in the polarization reduction target area is not necessarily one type of polarization component. Depending on the subject reflecting the light, the shape of the histogram may vary greatly; for example, there may be multiple peaks of polarization intensity in a histogram.

Figure 9:
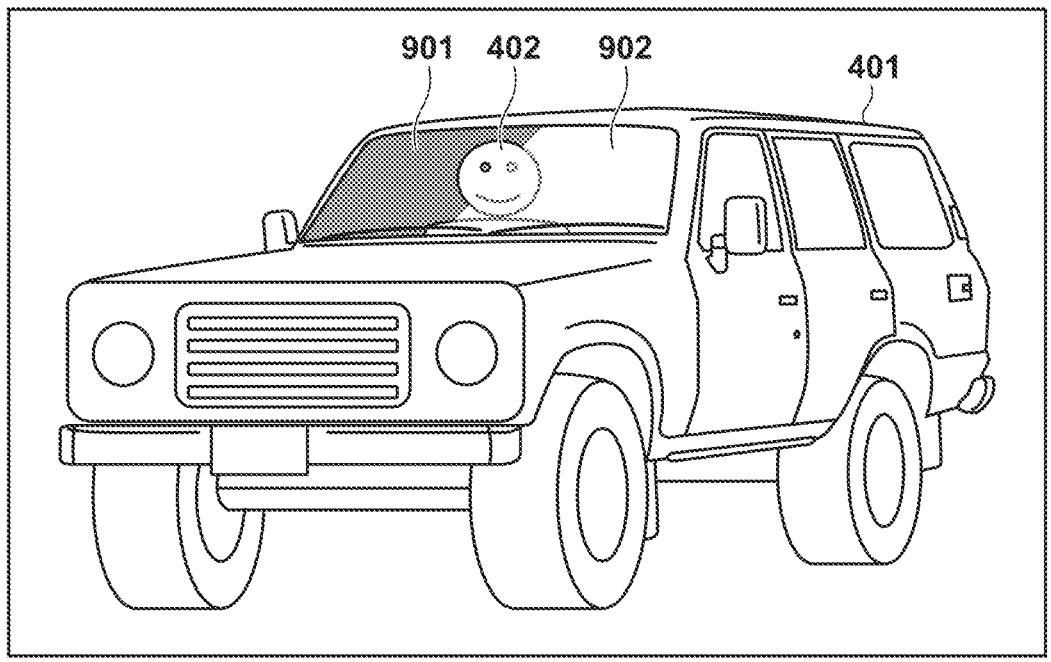
FIG. 9 is a diagram showing an example of a subject in the second to fourth embodiments.
Figure 10:
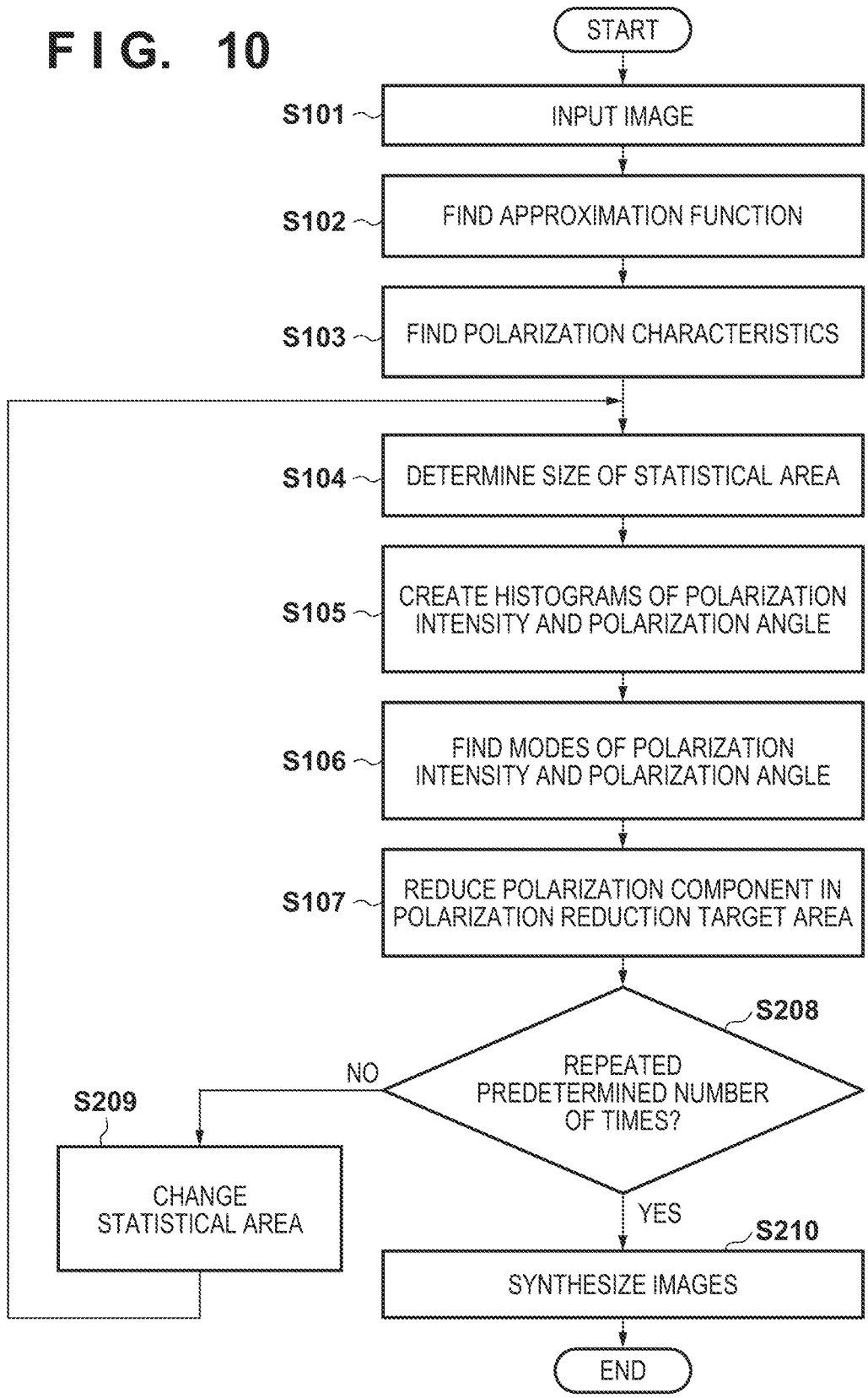
FIG. 10 is a flowchart showing a method for reducing a polarization component according to the second embodiment.

Accordingly, in the second embodiment, a method for reducing the polarization component in a subject that reflects light as shown in FIG. 9 will be described using a flowchart of FIG. 10. An area 901 in FIG. 9 is a region where light with low luminance is reflected, and an area 902 is a region where light with high luminance is reflected. Note that in FIG. 10, processes similar to those shown in FIG. 7 are given the same step numbers, and descriptions thereof will be omitted as appropriate.

The subject that includes a plurality of reflected lights with different polarization intensities as shown in FIG. 9 may include a boundary between polarizations in the polarization reduction target area. In such case, if a histogram of polarization intensity is created in step S105, the histogram will include multiple peaks. In this case, in the method of the first embodiment, in step S106, the one with the highest occurrence of frequency is selected as the representative polarization characteristic as the mode within the statistical area, and in step S107, polarization may be reduced using the representative polarization characteristic for each polarization reduction target area. However, if a plurality of polarization components having different polarization characteristics are included in the polarization reduction target area, the polarization components cannot be reduced correctly, and may cause noise.

Figure 8C:
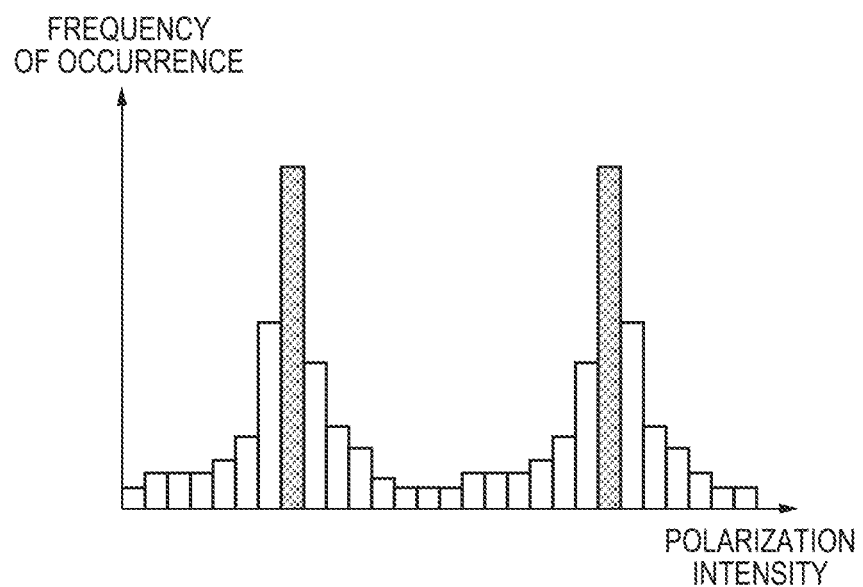
FIG. 8C is a diagram showing an example of a histogram showing the frequency of occurrence with respect to the polarization intensity according to the first to fourth embodiments.

Since the polarization intensities in the area 901 and in the area 902 differ from each other, the amplitudes of the approximation function F(θ) also differ. Therefore, if the statistical area spans the area 901 and the area 902, two types of polarization intensities will be included within the statistical area. If a histogram is created for such a statistical area, two peaks corresponding to the area 901 and area 902 appear in the histogram of polarization intensity, as shown in FIG. 8C. At this time, of the two peaks, the one with a larger value is selected as the mode, and becomes the representative polarization characteristic of the statistical area. However, if the polarization characteristic of the area 901 is selected as the representative polarization characteristic and the polarization component is removed, it results in reducing the inappropriate polarization component in the area 902.

Therefore, in the second embodiment, a plurality of depolarized images from which polarization components are reduced are generated while changing the statistical area of the polarization components. In step S208, it is determined whether a predetermined number of depolarized images corrected while changing the statistical area have been created through the processes in steps S101 to S107. If the predetermined number of times has been reached, the process directly advances to step S210. On the other hand, if the predetermined number of times has not been reached, the process advances to step S209 and the statistical area is changed.

In the case of a subject as shown in FIG. 9, depending on the content of the statistical area, there may be a polarization reduction target area which includes multiple polarized lights with different polarization intensities, such as the area 901 and area 902, and from which the polarization component cannot be successfully removed. In this case, by creating multiple depolarized images with the position and size of the statistical area being changed, the statistical area is selected so as not to include the polarization boundary according to the content of the statistical area, and a corrected image can be created.

In step S210, a synthesizing process such as averaging is performed on the plurality of depolarized images created while changing the statistical area to create one depolarized image. By doing so, noise may occur in each depolarized image due to polarization reduction with the wrong polarization component, but by synthesizing a plurality of images with different polarization reduction target areas, it is possible to reduce the adverse effect of noise and make the processed image approach the correct depolarized image.

In the second embodiment, a plurality of images are created in which the polarization component is reduced while changing the size and position of the statistical area, and the synthesizing process such as averaging is performed. In other words, near the boundary between two types of reflected light, even if the area contains two types of polarized light when the statistical area is taken the first time, when the statistical area is taken the Nth time, there may a case where only one type of polarized light is included within the statistical area. Then, by synthesizing the plurality of depolarized images corrected based on the representative polarization information of different statistical areas obtained in this way, it is possible to reduce the noise in a case where the polarization reduction is performed using the amount erroneous value comparing to a case where the polarization reduction is performed with one polarization reduction target area.

As described above, according to the second embodiment, by synthesizing a plurality of images with polarization reduced using statistical areas of different sizes and positions, polarization reduction (correction processing) can be performed in accordance with the subject or scene.

Third Embodiment

Next, a third embodiment of the present invention will be described.

In the second embodiment, a method has been described in which the size and position of the statistical area are changed to remove the polarization component if a plurality of types of reflected light with different polarization intensities are included in the polarization reduction target area. In the third embodiment, another polarization component reduction method will be described in a case where a plurality of types of reflected light with different polarization intensities are included in the polarization reduction target area as in the second embodiment.

Figure 11:
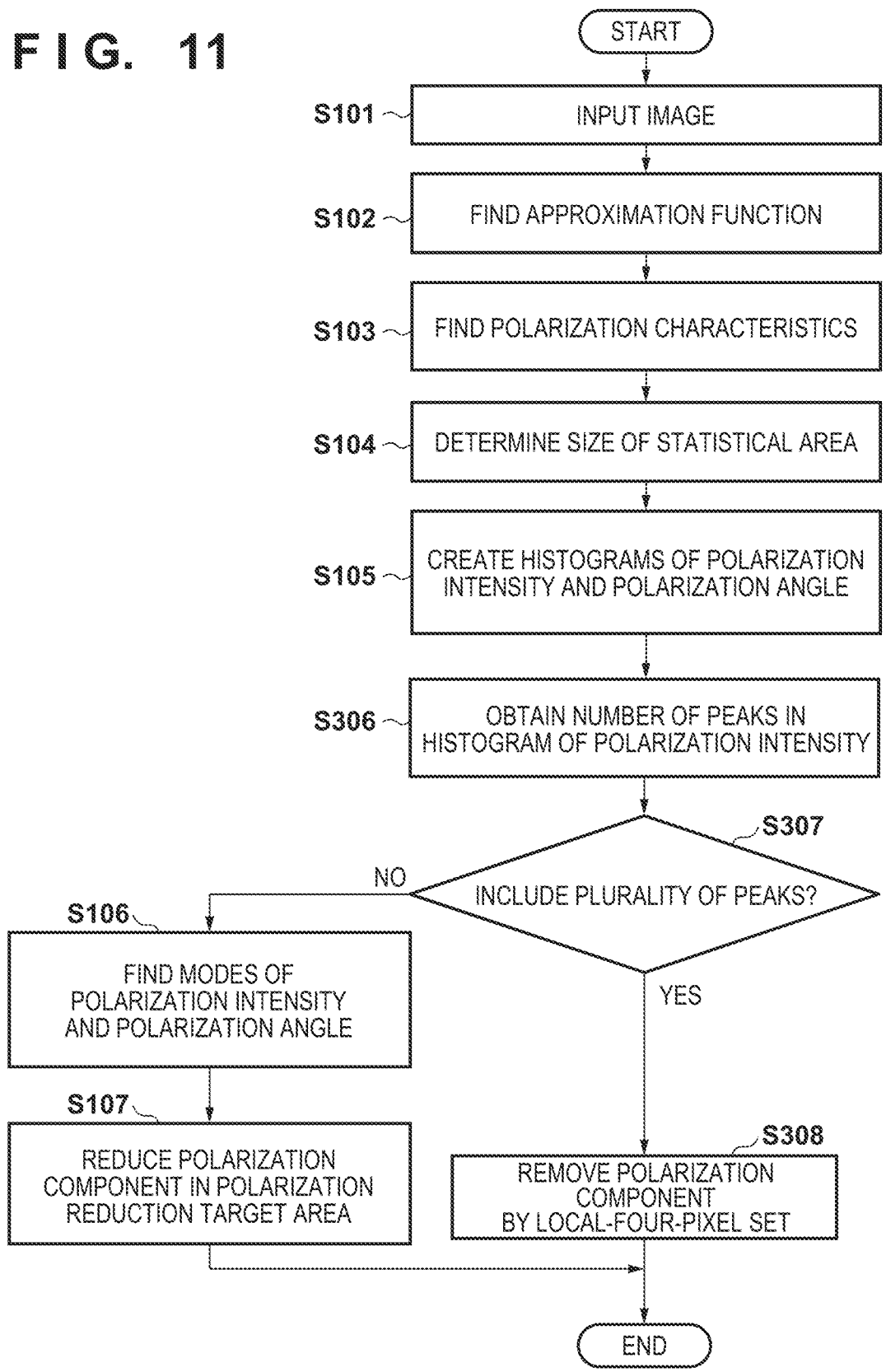
FIG. 11 is a flowchart showing a method for reducing a polarization component according to the third embodiment.

FIG. 11 is a flowchart showing a polarization component reduction method in the third embodiment. Note that in FIG. 11, processes similar to those shown in FIG. 7 are given the same step numbers, and descriptions thereof will be omitted as appropriate.

In step S306, the number of peaks of frequency of occurrence is obtained in the histogram of polarization intensity obtained in step S105. For example, if the area 901 and area 902 are included in the statistical area of a subject as shown in FIG. 9, two types of polarization intensities are included, so in the histogram of polarization intensity, as shown in FIG. 8C, two peaks corresponding to the area 901 and area 902 appear in the histogram of polarization intensity. On the other hand, if the statistical area is the area 400 as shown in FIG. 4, the histogram of polarization intensity has one peak.

Figure 7:
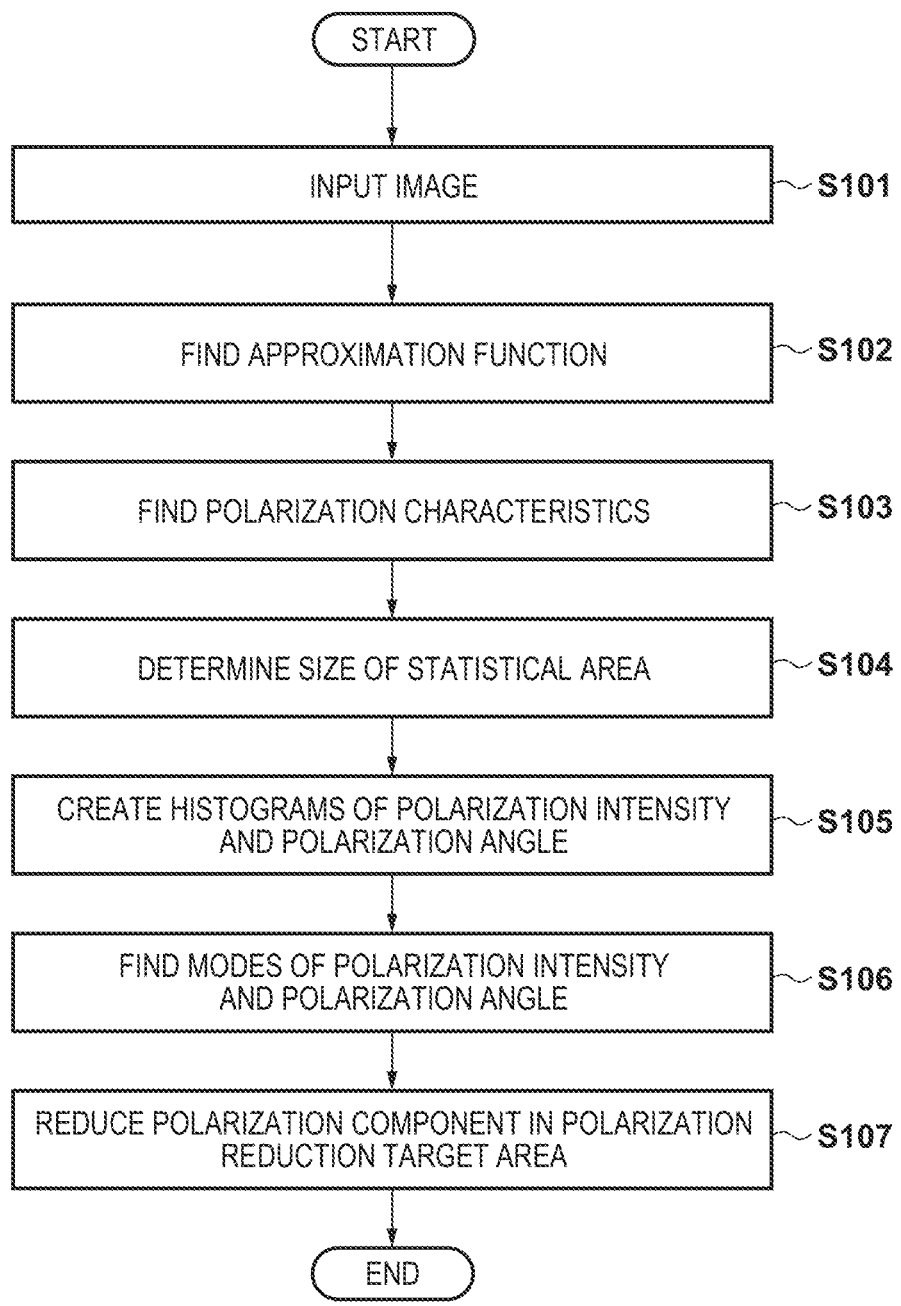
FIG. 7 is a flowchart showing a method for reducing a polarization component according to the first embodiment.

In step S307, it is determined whether the histogram of polarization intensity includes a plurality of peaks, and if there is one peak, in steps S106 and S107, the same processes as those described in the first embodiment with reference to FIG. 7 are performed, and the polarization is reduced using the representative polarization characteristics of the statistical area.

On the other hand, if a plurality of peaks are included, the process proceeds to step S308, where a polarization component is determined based on the polarization intensity and polarization angle determined for each local-four-pixel set, and the polarization component is removed.

As described above, according to the third embodiment, if there is one peak in the histogram of polarization intensity of the statistical area, polarization is reduced using the representative polarization characteristics for the image signal in the polarization reduction target area. On the other hand, if a plurality of peaks appear, the polarization components are reduced (correction processing) using the polarization intensity and polarization angle determined for each local-four-pixel set.

As described above, according to the third embodiment, even if a plurality of polarization components are included in the polarization reduction target area and a single representative polarization characteristic cannot be specified, generation of noise due to incorrect polarization component reduction can be suppressed.

Fourth Embodiment

Next, a fourth embodiment of the present invention will be described.

In the third embodiment, if it is determined that the histogram of polarization intensity in the polarization reduction target area includes a plurality of peaks, the polarization component reduction is performed for each local-four-pixel set using the polarization characteristics obtained for each local-four-pixel set, thereby avoiding erroneous polarization reduction due to the wrong polarization component. However, the histogram of polarization intensity does not necessarily have a shape that allows determination of a plurality of peaks as shown in FIG. 8C. Depending on the subject, the peaks may not be clear as shown in FIG. 8D, and it may be difficult to accurately determine the number of peaks.

Figure 8D:
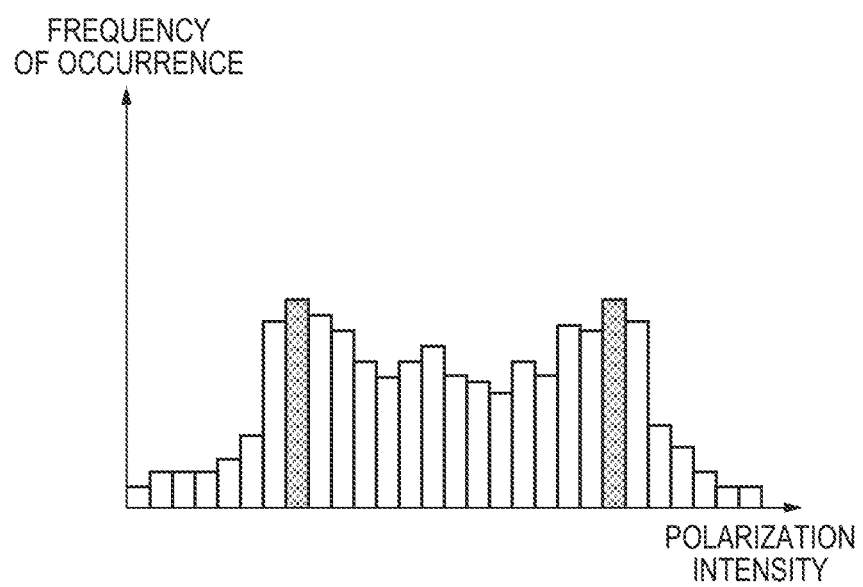
FIG. 8D is a diagram showing an example of a histogram showing the frequency of occurrence with respect to the polarization intensity according to the first to fourth embodiments.

Accordingly, in the fourth embodiment, a method of improving the accuracy of determining the number of peaks by excluding unnecessary polarization characteristics when the histogram of polarization intensity has a shape as shown in FIG. 8D will be described.

If an edge of a polarization component or an edge of a non-polarization component is included in the local-four-pixel set for which the approximation function is to be obtained, it is basically impossible to calculate correct polarization characteristics. Furthermore, the obtained approximation function varies depending on the direction of the edge, the included polarization characteristics, etc. For example, in a case where the polarization reduction target area contains many edges of a non-polarization component, when a histogram of polarization intensity is created, the histogram will have a shape in which one peak is included and noise components, including edges within the local-four-pixel set, are dispersed, as shown in FIG. 8D. In addition, in a case where the polarization reduction target area contains a plurality of different types of polarization intensities, a created histogram may have a shake in which, although the number of peaks will vary depending on the types of polarization intensities, depending on the shapes of the peaks, the peaks may be buried in noise components and the number thereof may not be determined.

Therefore, in the fourth embodiment, the mode is obtained from the histogram of polarization angle, and the polarization intensity of a local-four-pixel set having polarization angle that is considerably different from the mode is excluded from the histogram of polarization intensity. That is, the polarization intensity histogram is regenerated using the polarization intensity of local-four-pixel set having a polarization angle within a predetermined range from the mode. By doing so, it is possible to create a histogram of polarization intensity from which data of pixels for which an incorrect approximation function of polarization characteristics is obtained since an edge is included in the four pixels is excluded. Thereby, the shape of the polarization intensity histogram can be formed with only correct polarization characteristics, and the determination accuracy in the third embodiment can be improved.

Fifth Embodiment

Next, a fifth embodiment of the present invention will be described.

Figure 12:
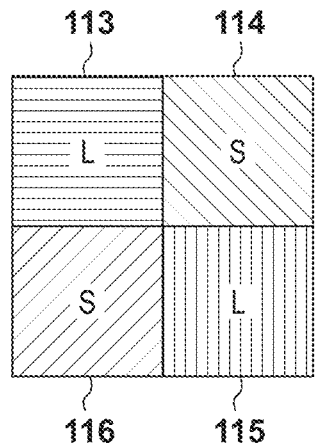
FIG. 12 is a diagram showing an exposure period and an arrangement example of a polarizing filter for HDR synthesis according to a fifth embodiment.

By acquiring image signals obtained by using different exposure conditions in each local-four-pixel set with different polarization directions, High Dynamic Range rendering (HDR) synthesis, which is a method of expanding the dynamic range, can be performed with a single exposure. FIG. 12 is a diagram showing the relationship between the arrangement of polarizing filters and exposure period. In this embodiment, it is assumed that the arrangement of polarizing filters is the same as that of the polarizing filters 113 to 116 shown in FIGS. 2A and 2B, and the exposure period of the pixels corresponding to the polarizing filters 113 and 115 is set to long (L), and the exposure period of the pixels corresponding to the polarizing filters 114 and 116 is set to short (S). Then, by performing image synthesis while taking the ratio of the exposure periods into account, it is possible to synthesize to obtain an image with a wide dynamic range.

Figure 13A:
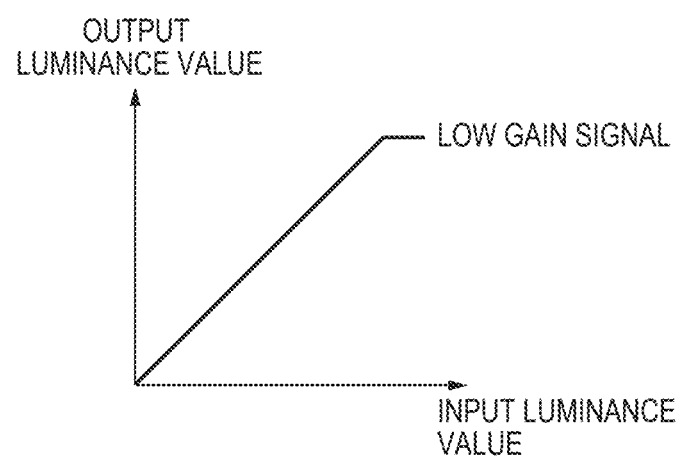
FIG. 13A is a diagram illustrating HDR synthesis.
Figure 13B:
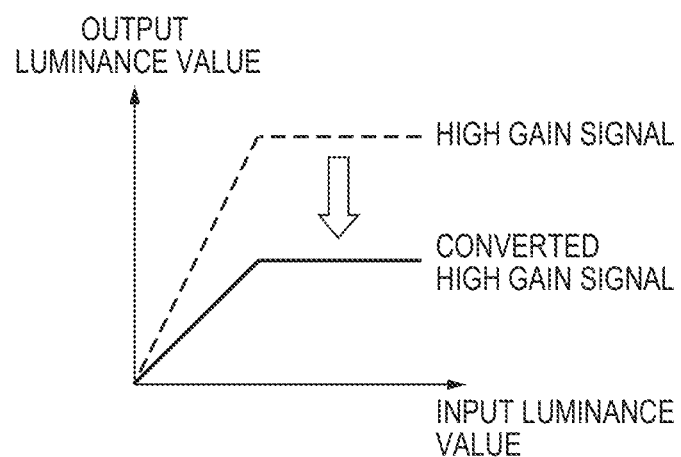
FIG. 13B is a diagram illustrating the HDR synthesis.
Figure 13C:
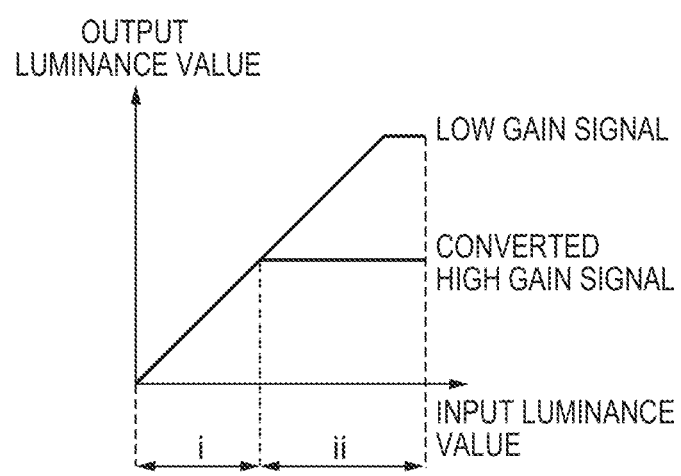
FIG. 13C is a diagram illustrating the HDR synthesis.

Here, a simple HDR synthesis method that does not use a polarizing filter will be described with reference to FIGS. 13A to 13C. Note that here, a signal obtained with the exposure condition of a long exposure period (L) is called a high gain signal, and a signal obtained with the exposure condition of a short exposure period (S) is called a low gain signal. The solid line in FIG. 13A shows the relationship between the output luminance value and the input luminance value of the low gain signal. The broken line in FIG. 13B shows the relationship between the output luminance value and the input luminance value of the high gain signal, and the solid line in FIG. 13B shows the relationship between the output luminance value and the input luminance value of a converted high gain signal obtained by compressing the relationship between the output luminance value and the input luminance value of the high gain signal by the ratio of the exposure conditions of the high gain signal and the low gain signal. FIG. 13C shows the low gain signal shown in FIG. 13A and the converted high gain signal shown in FIG. 13B on the same graph. For example, in the input luminance value region i, the converted high gain signal is used to generate the output luminance value, and in the input luminance value region ii, the low gain signal is used to generate the output luminance value, thereby HDR synthesis is performed.

However, if the polarizing filters 113 to 116 having different polarization angles are arranged in front of each pixel of the local-four-pixel set, the ratio of pixel values and the ratio of exposure conditions will not match between the low gain signal and the high gain signal.

Figure 14A:
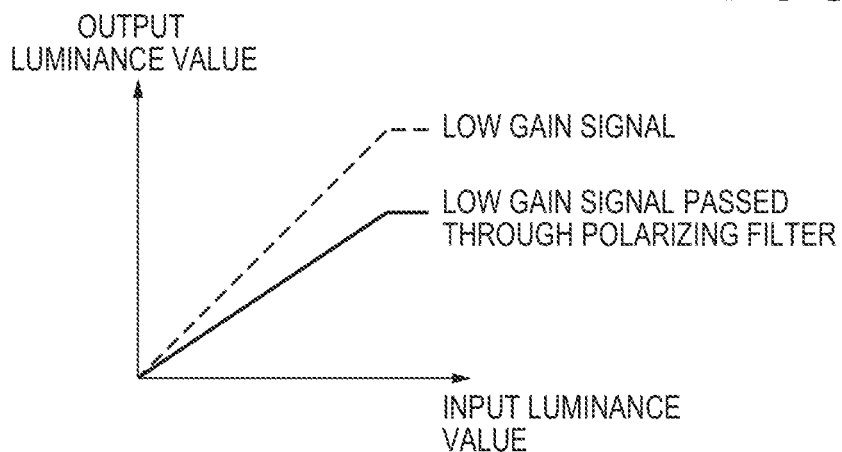
FIG. 14A is a diagram illustrating a problem that occurs in HDR synthesis when a polarizing filter is used.
Figure 14B:
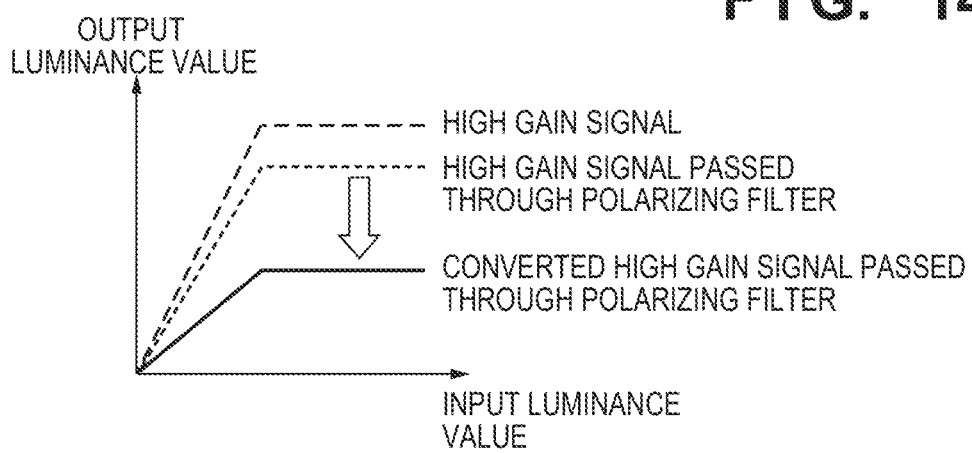
FIG. 14B is a diagram illustrating a problem that occurs in the HDR synthesis when the polarizing filter is used.
Figure 14C:
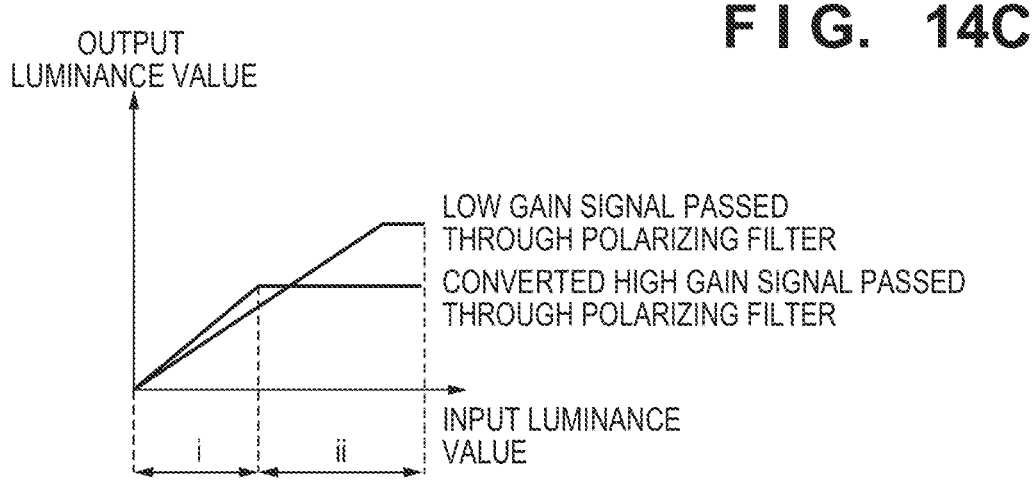
FIG. 14C is a diagram illustrating a problem that occurs in the HDR synthesis when the polarizing filter is used.

FIGS. 14A to 14C show an example of the relationship between input luminance value and output luminance value in a case where the HDR synthesis method shown in FIGS. 13A to 13C is applied when polarizing filters with different polarization angles are used. The broken line in FIG. 14A shows the relationship between the output luminance value and the input luminance value of the low gain signal shown by the solid line in FIG. 13A, and the solid line in FIG. 14A shows the relationship between the output luminance value and the input luminance of the low gain signal of light that have passed through the polarizing filter of a predetermined polarization angle. The broken line in FIG. 14B shows the relationship between the output luminance value and the input luminance value of the high gain signal shown by the broken line in FIG. 13B, and the dotted line in FIG. 14B shows the relationship between the output luminance value and the input luminance value of the high gain signal of light that have passed through the polarizing filter of a predetermined angle. In addition, the solid line in FIG. 14B shows the relationship between the output luminance value and the input signal value of the converted high gain signal obtained by converting the high gain signal of light that have passed through the polarizing filter with the ratio of the exposure conditions of the high gain signal and the low gain signal.

FIG. 14C shows the low gain signal of light passing through the polarizing filter expressed by the solid line in FIG. 14A and the converted high gain signal of light passing through the polarizing filter expressed by the solid line in FIG. 14B on the same graph. For example, in the input luminance value region i, the converted high gain signal of light passing through the polarizing filter is used to generate the output luminance value, and in the input luminance value region ii, the low gain signal of light passing through the polarizing filter is used to generate the output luminance value. However, in this case, a gap occurs at the boundary between the input luminance value region i and the input luminance value region ii. Furthermore, since the slope of the low gain signal of light passing through the polarizing filter is different from the slope of the converted high gain signal of light passing through the polarizing filter, linearity cannot be maintained. Therefore, there is a problem that desired HDR synthesis cannot be performed due to the gap and nonlinearity caused by errors in the polarizing filter.

In view of the above-mentioned problems, in the fifth embodiment, HDR synthesis in a case where the polarization reduction method implemented in the first embodiment is performed will be described.

Figure 15:
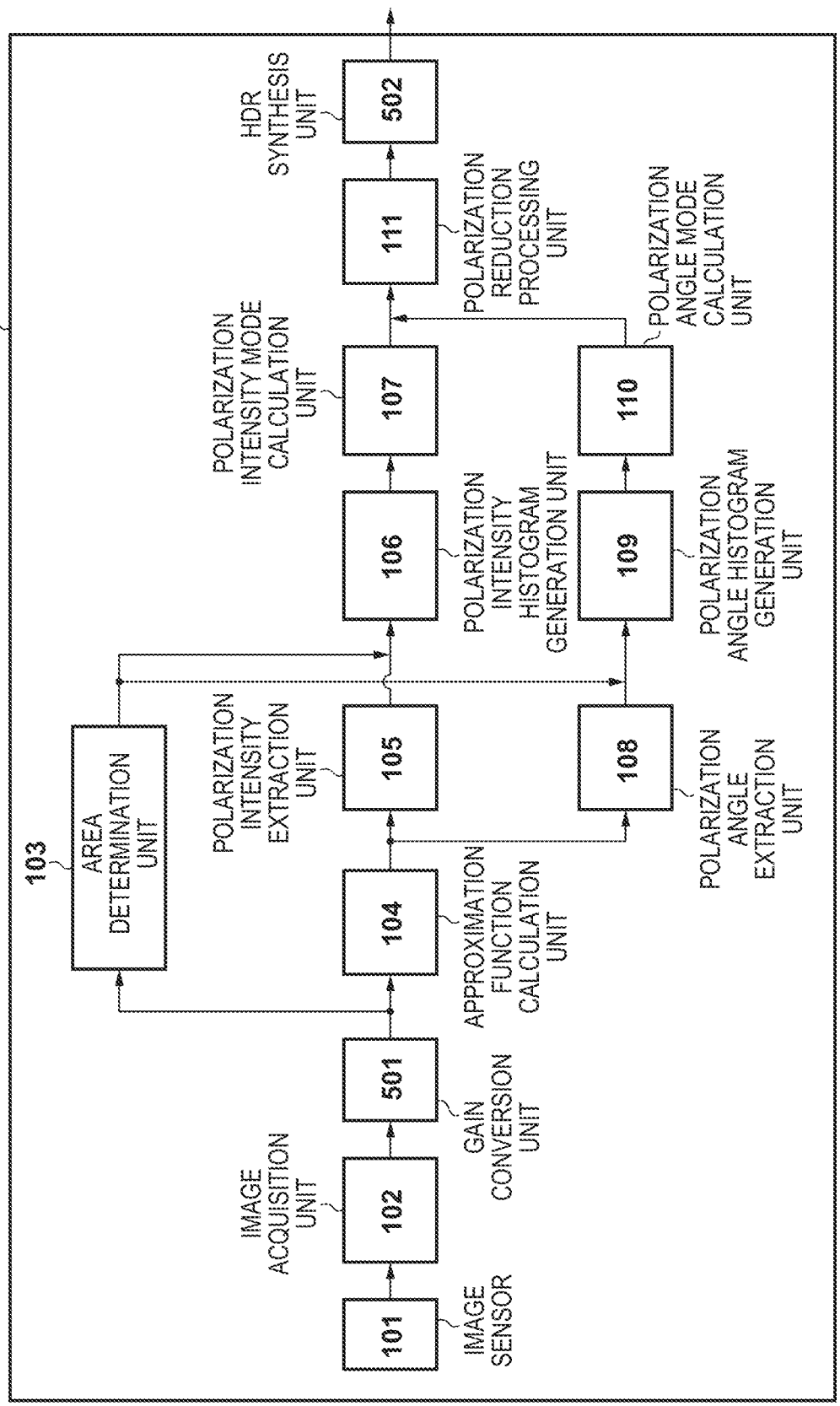
FIG. 15 is a block diagram showing a functional configuration of an image capturing apparatus according to the fifth embodiment.

FIG. 15 is a block diagram showing the functional configuration of an image capturing apparatus 500 in the fifth embodiment, in which HDR synthesis is performed after polarization reduction. The image capturing apparatus 500 has a gain conversion unit 501 and an HDR synthesis unit 502 in addition to the configuration of the image capturing apparatus 100 shown in FIG. 1, and the same reference numerals are given to the same constituents as those of the image capturing apparatus 100, and the description thereof will be omitted.

In the fifth embodiment, as shown in FIG. 12, each local-four-pixel set is covered with the polarizing filters 113 to 116, and the pixels covered with the polarizing filters 113 and 115 will be exposed for a long time (L), and the pixels covered by the polarizing filters 114 and 116 will be exposed for a short time (S). Note that in the fifth embodiment, it is assumed that a high gain signal and a low gain signal are obtained depending on the exposure period, but the present invention is not limited to this. For example, the sensitivity may be changed using the gain of the amplifier included in the image sensor 101, or both the exposure period and the sensitivity may be changed.

Figure 16:
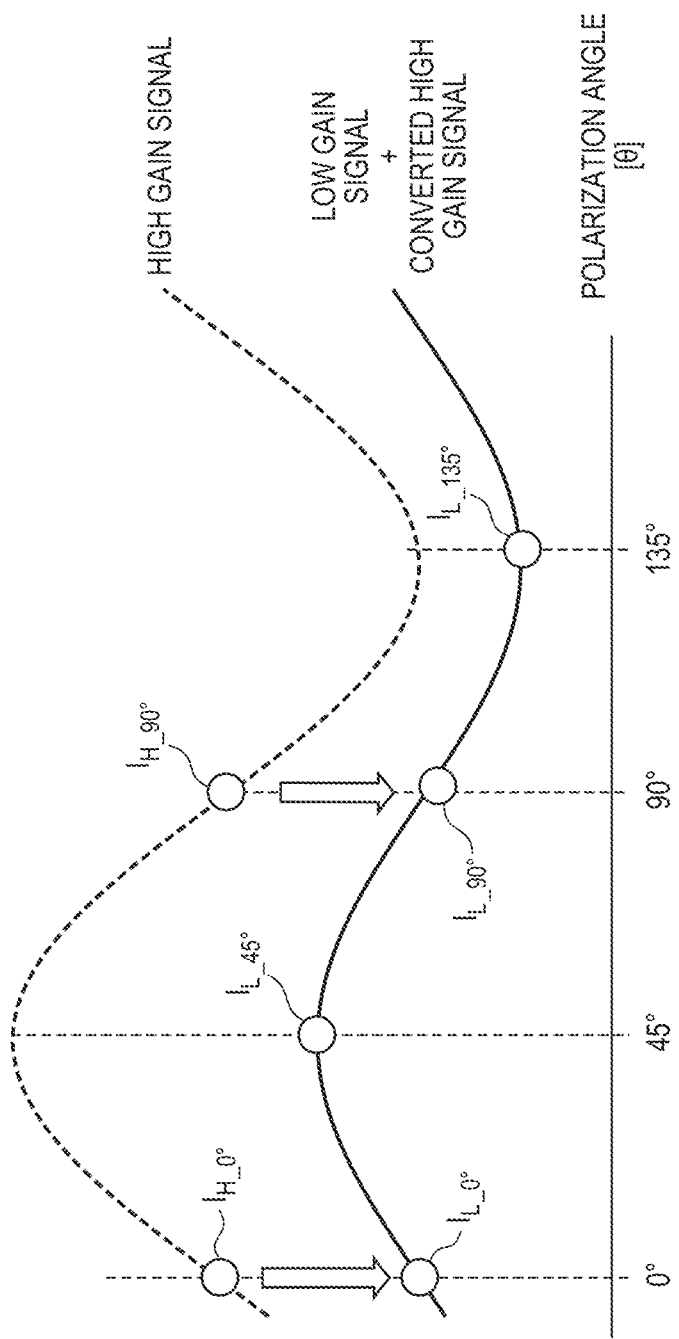
FIG. 16 is a diagram showing a gain conversion for acquiring an approximation function of a polarization component according to the fifth embodiment.

Image signals obtained by the image sensor 101 and having different exposure conditions within the local-four-pixel set are sent to the image acquisition unit 102 and then input to the gain conversion unit 501. FIG. 16 shows an example of pixel values (luminance values) obtained from a local-four-pixel set input to the gain conversion unit 501. Luminance $I_{H\_0}°$, which is a high gain signal, is obtained from the pixel covered by the polarizing filter 113 whose polarization angle is 0°. Luminance $I_{L\_45}°$, which is a low gain signal, is obtained from the pixel covered by the polarizing filter 114 whose polarization angle is 45°. Luminance $I_{H\_90}°$, which is a high gain signal, is obtained from the pixel covered by the polarizing filter 115 whose polarization angle is 90°. In addition, luminance $I_{L\_135}°$, which is a low gain signal, is obtained from the pixel covered by the polarizing filter 116 whose polarization angle is 135°.

Since the exposure conditions are different for each pixel of the local-four-pixel set, if the output of the image acquisition unit 102 is used as it is to remove polarization, it will not be possible to obtain appropriate polarization characteristics. Therefore, the gain conversion unit 501 converts each pixel into a value obtained with the same gain based on the exposure conditions of the local-four-pixel set. Here, the luminance $I_{H\_0}°$ and the luminance $I_{H\_90}°$ obtained as the high gain signals are converted to the low gain signals, and the luminance $I_{L\_0}°$ and the luminance $I_{L\_90}°$ are obtained as the pixel values of the converted high gain signals. However, the method of gain conversion is not limited to this, since the gain conversion may be performed to adjust to a high gain signal or to a signal of a different gain.

The image signal converted by the gain conversion unit 501 has its polarization reduced by processing performed by the area determination unit 103 through the polarization reduction processing unit 111 described in the first embodiment, and the depolarized image is input to the HDR synthesis unit 502. Assuming that appropriate polarization reduction has been performed on the depolarized image input to the HDR synthesis unit 502, the relationship shown in FIG. 13C can be obtained. Therefore, as explained with reference to FIGS. 13A to 13C, HDR synthesis is performed by using a converted high gain signal in the region i and using a low gain signal in the region ii. The HDR synthesis method shown in the embodiment is an example, and is not limited to this. For example, a low gain signal may be converted and used for HDR synthesis, pixel values obtained with respective exposure conditions may be appropriately selected, or added.

Figure 17:
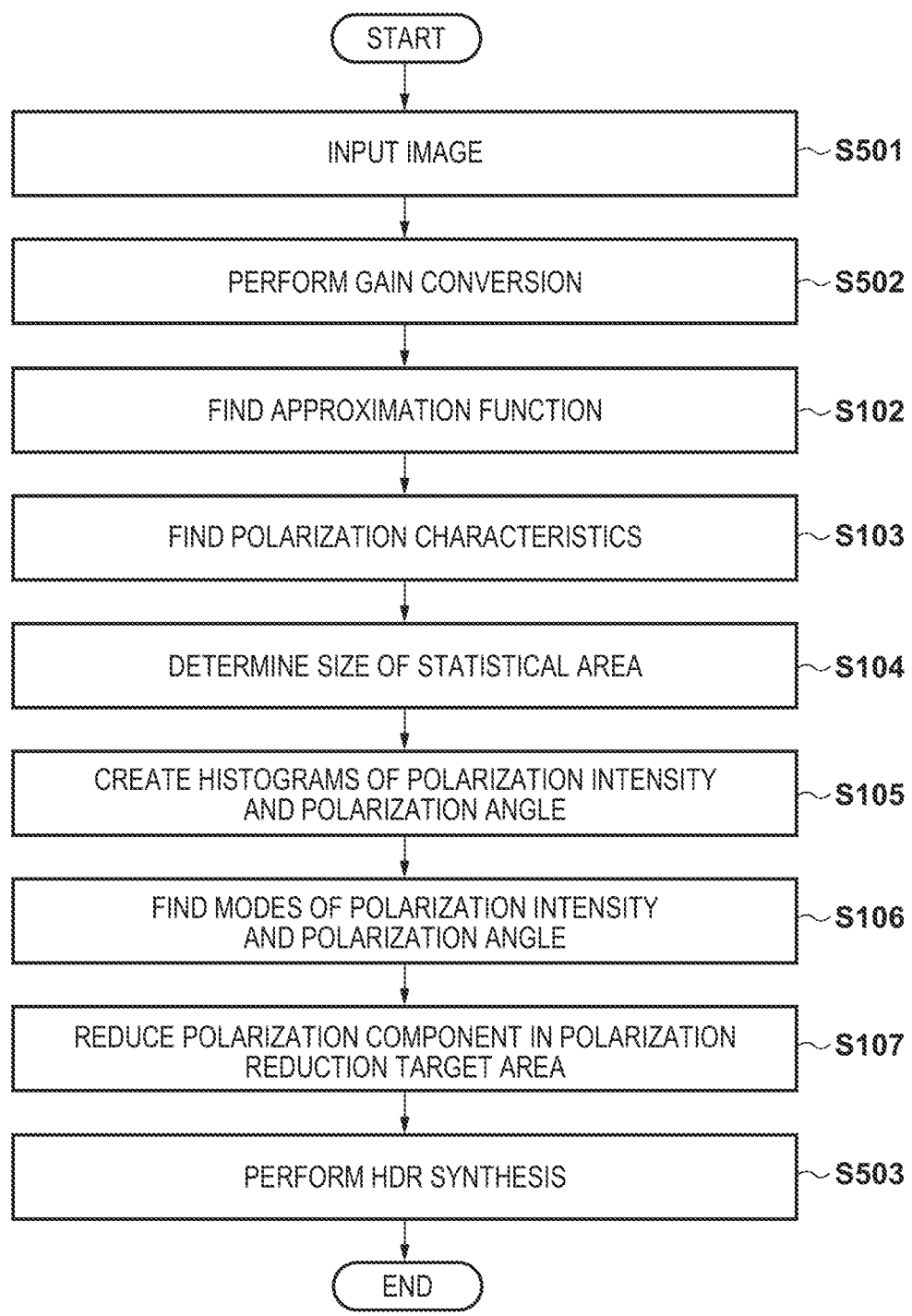
FIG. 17 is a flowchart of an HDR synthesis process using depolarized images according to the fifth embodiment.

Next, the processing of performing HDR synthesis after reducing polarization component in the fifth embodiment will be described with reference to the flowchart shown in FIG. 17. In the processing of FIG. 17, the same reference numerals are given to the same processes as those explained in FIG. 7 in the first embodiment, and the description thereof is omitted as appropriate.

In step S501, the image acquisition unit 102 acquires image signals obtained under different exposure conditions output from each local-four-pixel set of the image sensor 101. In step S502, the acquired image signals are gain-converted in the gain conversion unit 501 as described above, and the acquired image signals are adjusted so that the differences due to different exposure conditions are evened out, thereby creating image signals from which polarization can be removed.

Then, in steps S102 to S106, polarization reduction processing (correction processing) is performed based on the polarized images subjected to gain conversion by the gain conversion unit 501 using the methods described in the first to fourth embodiments. In step S503, the HDR synthesis unit 502 performs HDR synthesis using the image signals from which the polarization component has been reduced by the polarization reduction processing unit 111.

As described above, according to the fifth embodiment, image signals obtained with different exposure conditions are acquired in each local-four-pixel set, the exposure conditions of the image signals are adjusted, polarization is removed, and then HDR synthesis is performed. As a result, even if the local-four-pixel set is covered by polarizing filters with different polarization angles and different exposure conditions are used for the local-four-pixel set to perform HDR composition, it becomes possible to generate an HDR image with an expanded dynamic range while reducing the influence of errors in pixel values caused by the polarizing filter.

Sixth Embodiment

Next, a sixth embodiment of the present invention will be described.

Note that the configuration of the image capturing apparatus 100 in the sixth embodiment is the same as that shown in FIG. 1, so the description thereof will be omitted.

As explained in the previous embodiments, the on-imaging surface polarizing sensor 112 is equipped with polarizing filters with a plurality of different polarization angles for each local-four-pixel set, and the incident light is photoelectrically converted and output as an image signal. Then, using the luminance values of the output image signal, an approximation function of a luminance component (polarization component) that changes depending on the polarization angle is determined, and the polarization components are extracted.

However, if the edge part of the subject is included in the local-four-pixel set, it may not be possible to obtain the correct approximation function for the local-four-pixel set, or even if the approximation function is obtained, the obtained polarization components of only that local-four-pixel set will be false information which is completely different from that of the surrounding area. Therefore, the polarization component for each polarization angle in the statistical area is calculated from the mode of polarization information in the polarization reduction target area, and is applied to all local-four-pixel sets in the polarization reduction target area.

Figure 18:
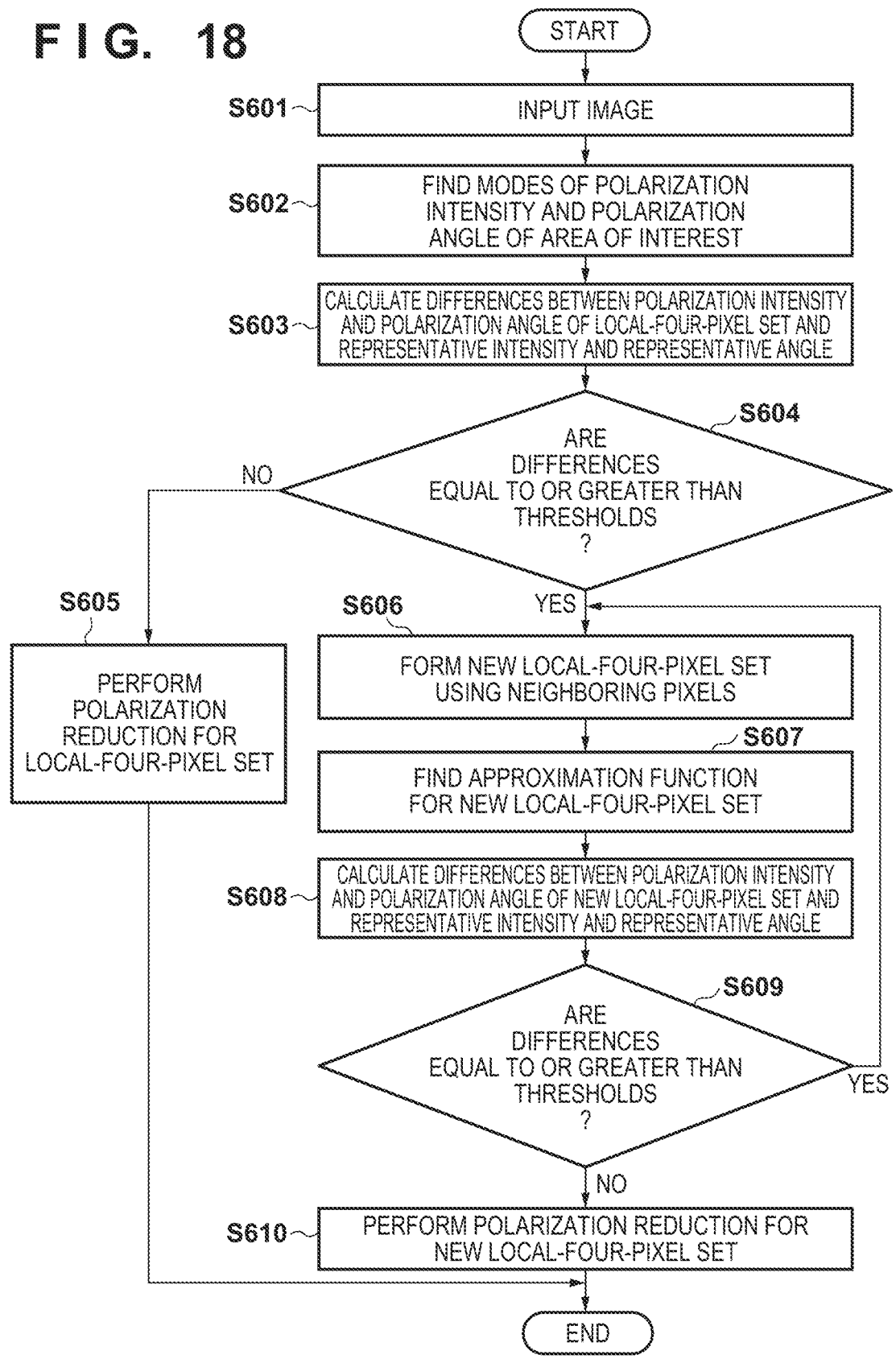
FIG. 18 is a flowchart showing a method for reducing a polarization component according to the sixth embodiment.

In contrast, in the sixth embodiment, first, the polarization components of the local-four-pixel set and the representative polarization components in the statistical area are compared to determine whether the polarization intensities or polarization angles of the them are close to each other. The processing in this embodiment will be described below using the flowchart in FIG. 18.

First, in step S601, a target image signal is input from the on-imaging surface polarizing sensor 112, and in step S602, and the modes of the polarization intensity and polarization angle of the statistical area are determined as described in any of the first to fourth embodiments.

Then, in step S603, the intensity difference and angular difference between the polarization intensity and polarization angle of each local-four-pixel set and the representative intensity and representative angle of the statistical area, respectively, are determined.

In step S604, it is determined whether the intensity difference and the angular difference obtained in step S603 are both greater than or equal to respective preset thresholds. If both are less than the thresholds, it is assumed that the edge portion is not included, and the process proceeds to step S605, where polarization is reduced using the polarization component calculated in step S602 for the image signal output from the local-four-pixel set.

Figure 19:
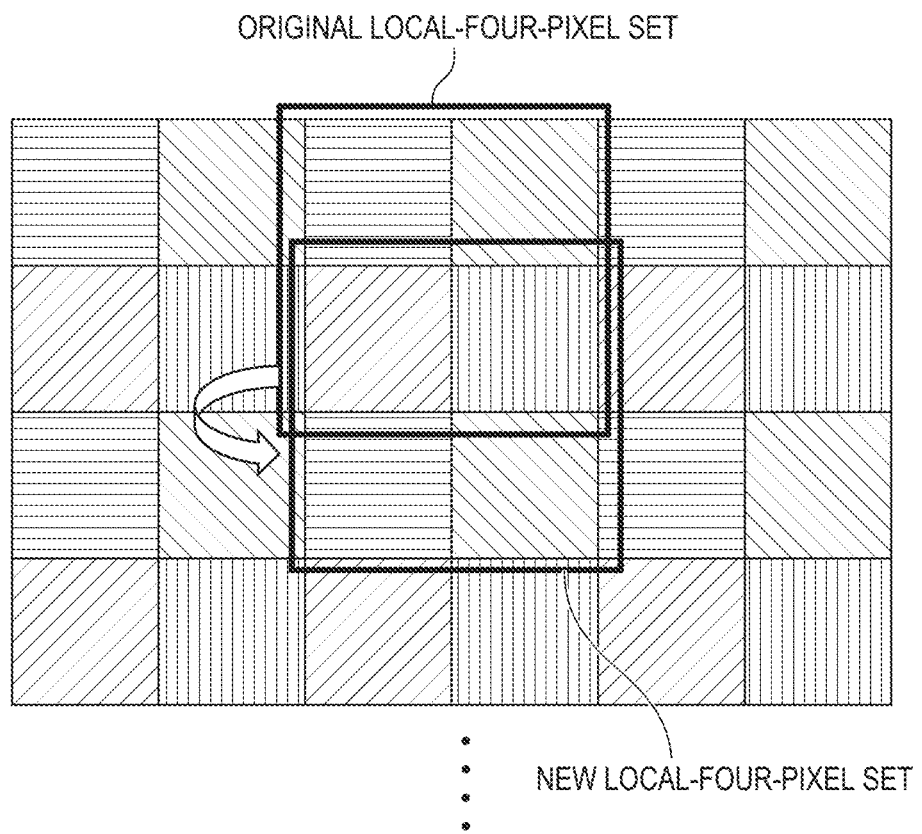
FIG. 19 is a diagram illustrating how to shift a local-four-pixel set according to the sixth embodiment.

On the other hand, if at least either the intensity difference or the angular difference is greater than or equal to the threshold, it is assumed that the local-four-pixel set includes an edge portion, and the process advances to step S606 to change the formation of the local-four-pixel set. Here, as shown in FIG. 19, a new local-four-pixel set is formed by shifting one pixel in either the vertical or horizontal direction. Then, in step S607, the approximation function $F(\theta)$ for the new local-four-pixel set is determined, and the polarization intensity and polarization angle are obtained. Then, in step S608, the intensity difference and angular difference between the polarization intensity and polarization angle of the new local-four-pixel set and the representative intensity and representative angle, respectively, are determined.

In step S609, it is determined whether the intensity difference and angular difference obtained in step S608 are greater than or equal to their respective threshold values. If both are less than the thresholds, it is assumed that the new local-four-pixel set does not include any edge portion, and the process proceeds to step S610, where the image signal output from the new local-four-pixel set is subjected to the polarization reduction using the polarization component calculated in step S602.

On the other hand, if at least either the intensity difference or the angle difference is greater than or equal to the threshold, it is assumed that the new local-four-pixel set also includes an edge portion, and the process returns to step S606 to change the formation of the local-four-pixel set, and the above processes are repeated.

If at least either the intensity difference or the angle difference exceeds the threshold even if the formation of the local-four-pixel set is shifted to any of up, down, right and left direction, polarization reduction may be applied to the local-four-pixel set of the formation with the smallest difference, for example.

As described above, according to the sixth embodiment, polarization reduction suitable for various subjects can be performed by changing the formation of the local-four-pixel set to create a local-four-pixel set that does not include an edge.

Modification of Sixth Embodiment

Figure 20:
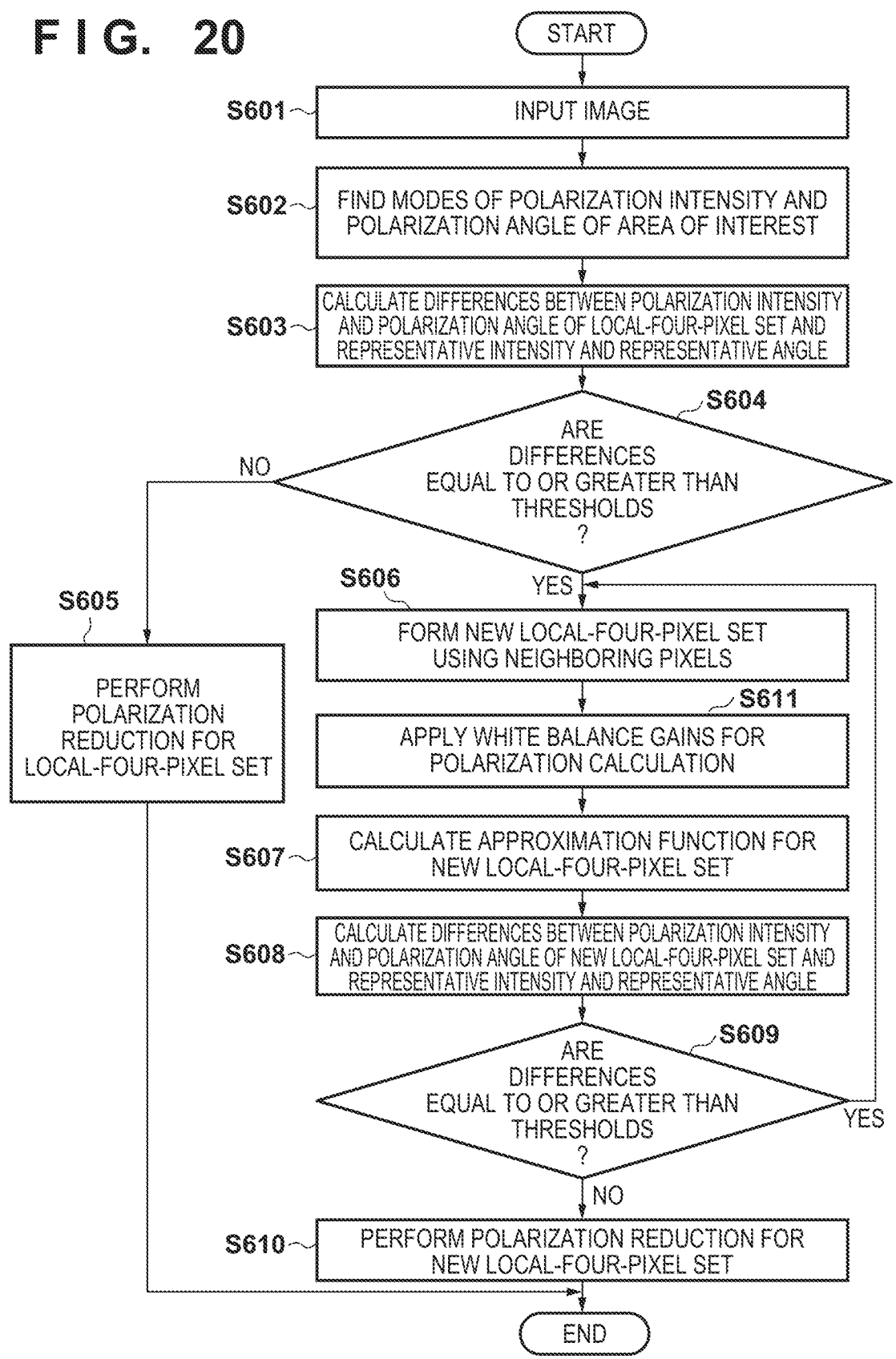
FIG. 20 is a flowchart showing a method for reducing a polarization component according to a modification of the sixth embodiment.

In the sixth embodiment, the case where the local-four-pixel set is re-formed by shifting the formation has been described, but in this modification, the processing in the case where color filters of multiple colors are arranged as shown in FIGS. 3A and 3B will be described using the flowchart of FIG. 20. Note that processes same as those shown in FIG. 18 described in the sixth embodiment are given the same reference numerals, and the description thereof will be omitted as appropriate.

The image signal input in step S601 is the output of the on-imaging surface polarizing sensor 112 provided with a color filter, and has color information. In this modification, as shown in FIGS. 3A and 3B, each local-four-pixel set is covered with a filter of one of R, G, and B color, and polarization intensity and polarization angle are calculated for each set.

In step S604, if the intensity difference and angular difference obtained in step S603 are both greater than the respective predetermined thresholds, it is assumed that the subject in the local-four-pixel set includes an edge portion, and the process proceeds to step S606, where adjacent pixels are used to form a new local-four-pixel set.

Figure 21:
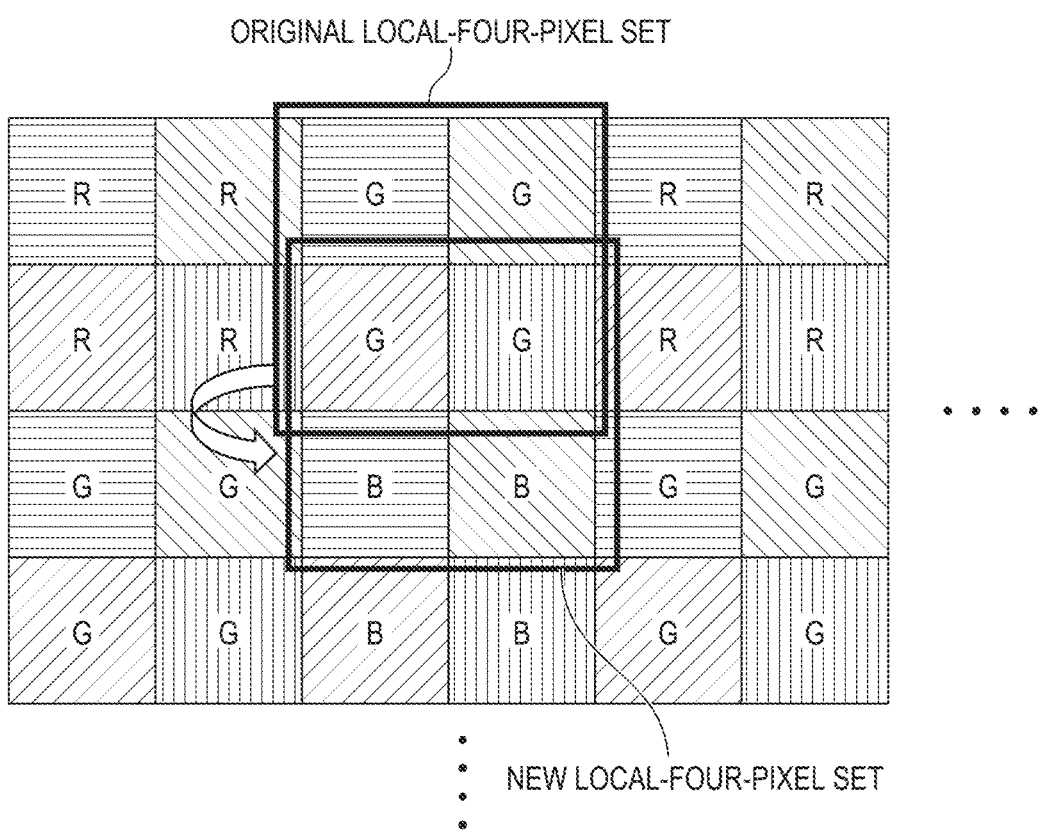
FIG. 21 is a diagram illustrating how to shift a local-four-pixel set according to the modification of the sixth embodiment.

In this modification, since each local-four-pixel set is covered with color filters of the same color, the output is different for each color in images that have not yet been developed. For example, if the local-four-pixel set is shifted downward by one pixel as shown in FIG. 21, the G filter and B filter will be mixed, and the approximation function $F(\theta)$ cannot be obtained from the output from the on-imaging surface polarizing sensor 112.

Therefore, in this modification, in step S611, a white balance gain for polarization calculation is calculated to match the polarization intensity of R, G, and B to that of G based on the representative intensity calculated within the statistical area. Then, multiply the polarization intensity of R and the polarization intensity of B by the white balance gain for polarization calculation, respectively, to make the polarization intensity almost the same as G, and then obtain the approximation function $F(\theta)$ with a new local-four-pixel set.

Conventionally, the white balance gain indicates gain values that adjust the R and B levels to the output of G of a reference white portion so as to correct to the reference white level. However, since the purpose here is not to accurately represent the color of the subject, a white balance gain for polarization calculation is used to obtain the approximation function.

By performing the above-described processing, it is possible to perform polarization reduction (correction processing) suitable for various subjects even in a case where an imaging surface polarization sensor equipped with a color filter is used.

Seventh Embodiment

Next, a seventh embodiment of the present invention will be described.

In the seventh embodiment, a method will be described in which the type of edge in the image acquired by the on-imaging surface polarizing sensor 112 is determined and polarization reduction (correction processing) is performed according to the determined type of edge.

Figure 22:
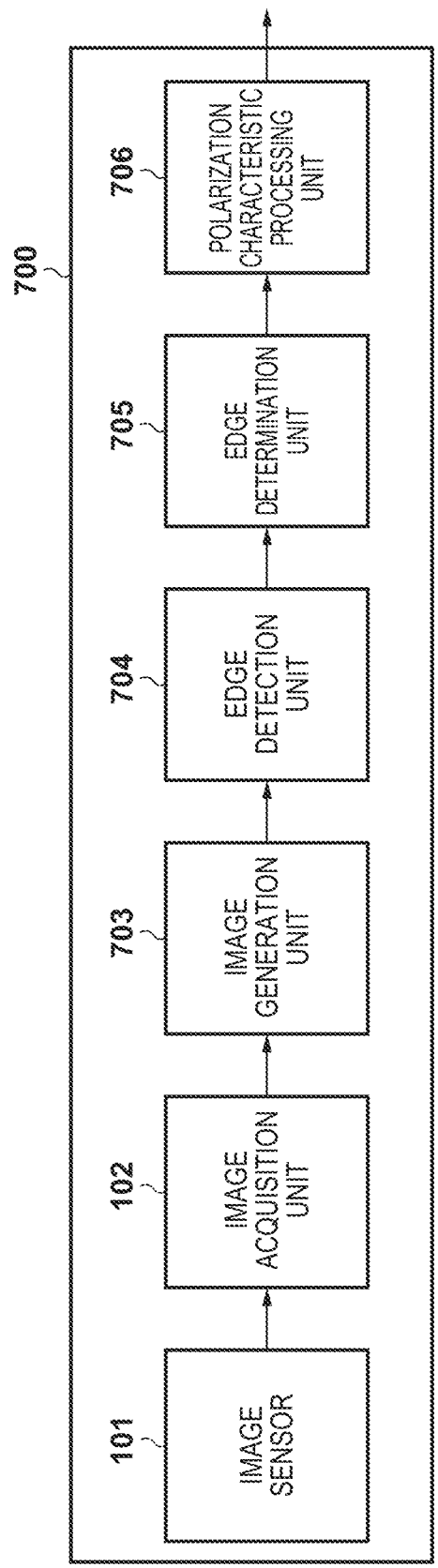
FIG. 22 is a block diagram showing a functional configuration of an image capturing apparatus according to a seventh embodiment.

FIG. 22 is a block diagram showing the functional configuration of an image capturing apparatus 700 according to the seventh embodiment. Note that the same components as in FIG. 1 are given the same reference numerals, and descriptions thereof will be omitted as appropriate. The image capturing apparatus 700 is an apparatus that performs inputting of images through outputting of images.

An image generation unit 703 separates the image signal acquired by the image acquisition unit 102 from the image sensor 101 for each polarization angle, and generates images of respective polarization. For example, if the subject shown in FIG. 4 is shot, four polarized images 121 to 124 shown in FIGS. 5A to 5D are obtained. At this time, the resolution of the polarized images generated by the image generation unit

703 is ¼ of the resolution of the image signal acquired by the image acquisition unit 102 from the image sensor 101.

Figure 23:
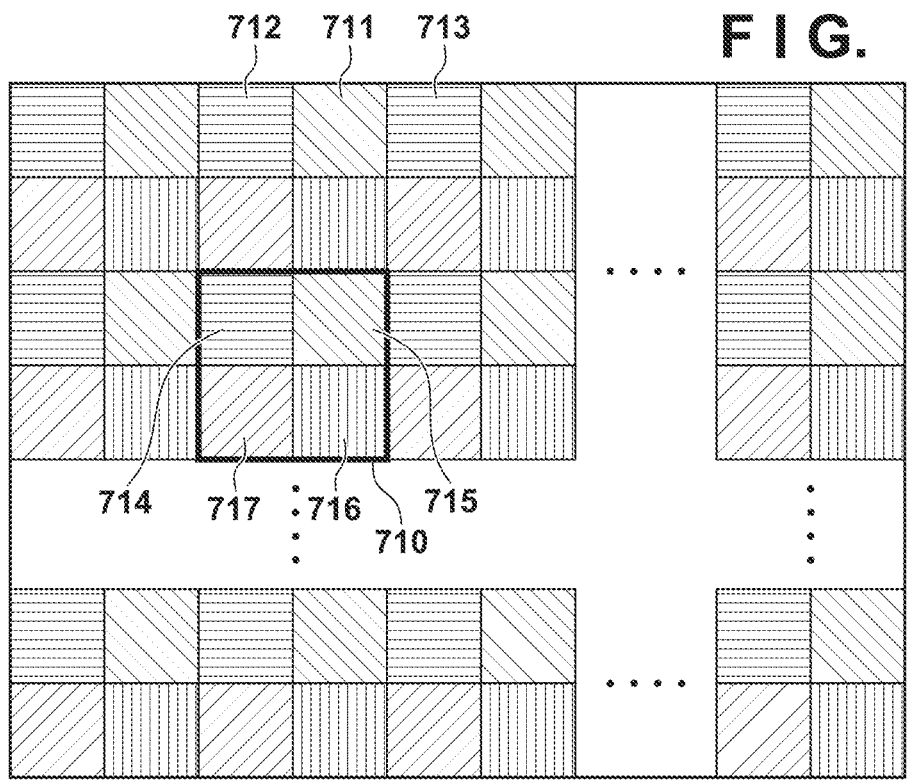
FIG. 23 is a diagram for explaining an interpolation method according to the seventh embodiment.

In this embodiment, an example was shown in which the image generation unit 703 separates image signals for each polarization angle to generate images, but images with the same resolution as the image signal obtained from the image sensor 101 may be generated by interpolating the separated image signals with image signals of the same polarization angle output from surrounding pixels. FIG. 23 is a diagram for explaining the interpolation method, and polarizing filters are arranged in the same manner as the polarizing filters shown in FIG. 2A.

Specifically, the pixel value of the polarization angle in the 0° direction with respect to the pixel of interest 711 where the polarizing filter 114 with a polarization angle of 45° is arranged is compensated with an average of the pixel values of the surrounding pixels 712 and 713 where the polarizing filter 113 with a polarization angle of 0° is arranged to generate an image. However, the above-mentioned interpolation method is merely an example, and the interpolation method is not limited to this, as it is also possible to refer to four surrounding pixels or to pixels in a diagonal direction.

Figure 24:
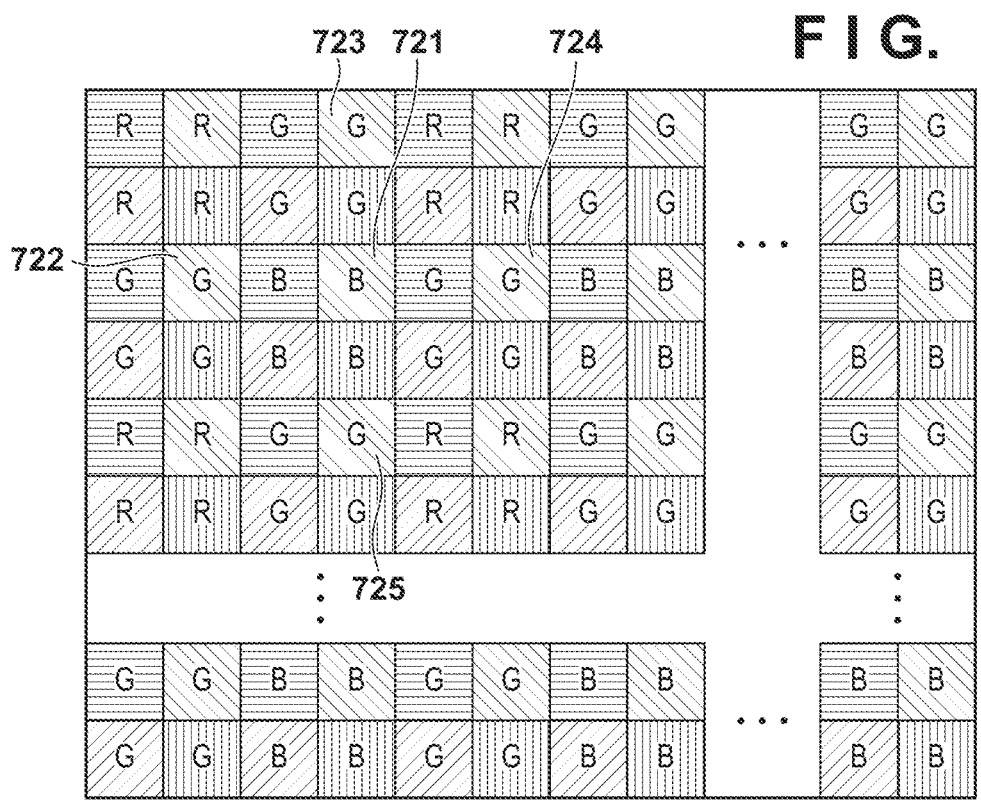
FIG. 24 is a diagram for explaining an interpolation method in a case where a color filter is used according to a seventh embodiment.

Furthermore, the on-imaging surface polarizing color sensor shown in FIGS. 3A and 3B may be used as the image sensor 101. FIG. 24 is a diagram for explaining the interpolation method in that case, and shows polarizing filters in the same arrangement as the polarizing filters shown in FIG. 3A. In this case, first, interpolation is performed using surrounding pixels having the same color and the same polarization angle as the pixel value to be interpolated for the pixel of interest. Next, by separating the image signals for each polarization angle, an image is generated for each color and each polarization angle.

Specifically, for a pixel of interest 721 where a B color filter and a polarizing filter 114 with a polarization angle of 45° are arranged, by taking an average value of the pixel values of four surrounding pixels 722 to 725 where G color filters and polarizing filters 114 are arranged, to interpolate the G pixel value. After generating a plane image for each color using this method, it is separated for each polarization angle to generate a polarized image for each color and each polarization angle. However, the above-mentioned interpolation method is an example and not limited to this, and interpolation may be performed by referring to eight surrounding pixels or to pixels in a diagonal direction. Further, the image generation method described above is an example and not limited to this, and the image to be generated may be only a G image or a YUV image obtained by performing YUV conversion on an RGB image.

An edge detection unit 704 detects the presence or absence of an edge in the pixel of interest based on the luminance difference with surrounding pixels in the polarized image generated by the image generation unit 703. Here, the edge detection method will be specifically explained using FIG. 25.

Figure 25:
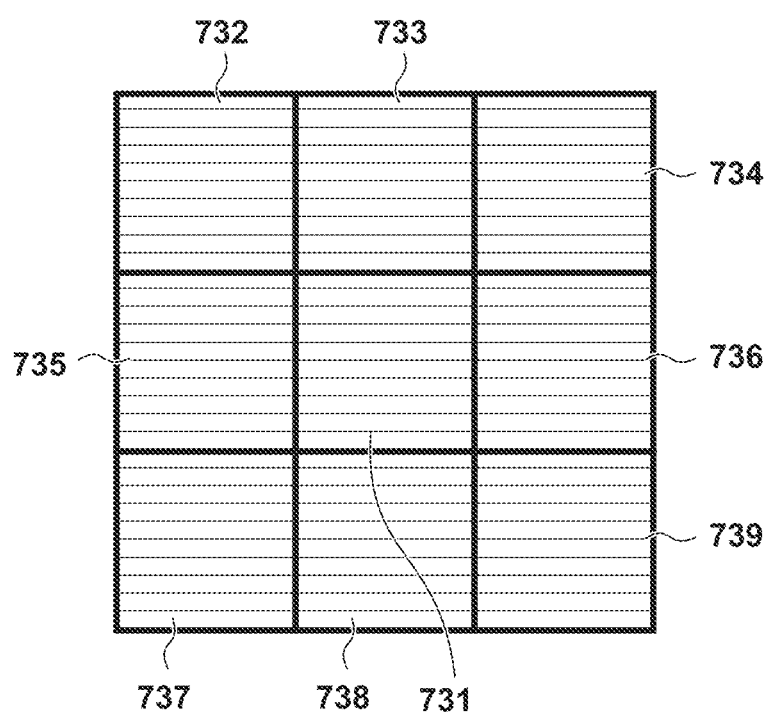
FIG. 25 is a diagram for explaining a method for determining presence or absence of an edge according to the seventh embodiment.

FIG. 25 shows a total of 9 pixels, 3 pixels in the vertical direction and 3 pixels in the horizontal direction, of the polarized image with a polarization angle of 0° generated by the image generation unit 703. A method for determining the presence or absence of an edge in a pixel of interest 731 will be described below.

First, the average pixel value of surrounding pixels 732, 735, and 737 is determined, and this is defined as the first vertical average value. Next, the average pixel value of surrounding pixels 733 and 738 and the pixel of interest 731 is determined, and this is defined as the second vertical average value. Furthermore, the average pixel value of surrounding pixels 734, 736, and 739 is determined, and this is defined as the third vertical average value. Similarly, in the horizontal direction, the average pixel value of the surrounding pixels 732, 733, and 734 is determined, and this is defined as the first horizontal average value. Next, the average pixel value of the peripheral pixels 735 and 736 and the pixel of interest 731 is determined, and this is defined as the second horizontal average value. Furthermore, the average pixel value of the surrounding pixels 737, 738, and 739 is determined, and this is defined as the third horizontal average value.

Subsequently, the difference between the first vertical average value and the second vertical average value is defined as a first difference. Further, the difference between the second vertical average value and the third vertical average value is defined as a second difference. Furthermore, the difference between the first horizontal average value and the second horizontal average value is defined as a third difference. Further, the difference between the second horizontal average value and the third horizontal average value is defined as a fourth difference. If all of the first to fourth differences are less than a predetermined threshold, it is determined that there is no edge, and if any of the first to fourth differences is greater than or equal to the predetermined threshold, it is determined that there is an edge.

Note that the edge detection method described above is merely an example, and the edge detection method itself is not limited to this, and edge detection in a diagonal direction may be performed or may be performed using a 3×3 edge detection filter.

An edge determination unit 705 focuses on pixels at the same position in the polarized images generated by the image generation unit 703 and compares the detection results of the edge detection unit 704 to identify the type of edge present in the local-four-pixel set. The determination result of the edge determination unit 705 indicates either there is no edge, an edge exists in a non-polarized area where light is not polarized (area other than the area 400 in FIG. 4), an edge of a non-polarization component exists in a polarized area (area 400), or an edge of a polarization component exists in a polarized area. A detailed edge determination method will be described later.

A polarization characteristic processing unit 706 processes the polarization characteristic of the polarized image according to the determination result of the edge determination unit 705. Specifically, in a case where the edge determination unit 705 determines that there is no edge, or in a case where the edge determination unit 705 determines that the edge is in a non-polarized area, the polarization characteristic processing unit 706 finds the approximation function F(θ) of the polarization characteristic using image signals from the local-four-pixel set to perform polarization reduction for each local-four-pixel set. Alternatively, the polarization may be reduced by a method similar to that of the first embodiment, or by a conventional method.

Furthermore, if the edge determination unit 705 determines that the edge is an edge of a non-polarization component in the polarized area, the polarization characteristic processing unit 706 performs the processing described in the first embodiment, that is, the polarization reduction is performed using the representative polarization characteristics in the divided area. If the edge determination unit 705 determines that the edge is an edge of a polarization component in the polarized area, the polarization characteristic processing unit 706 performs the processing described in the second embodiment, that is, the polarization reduction is performed by synthesizing a plurality of images with polarization reduced in different area sizes. However, the processing by the polarization characteristic processing unit 706 in this embodiment is merely an example, and different processing may be performed depending on the result of the edge determination unit 705.

Figure 26:
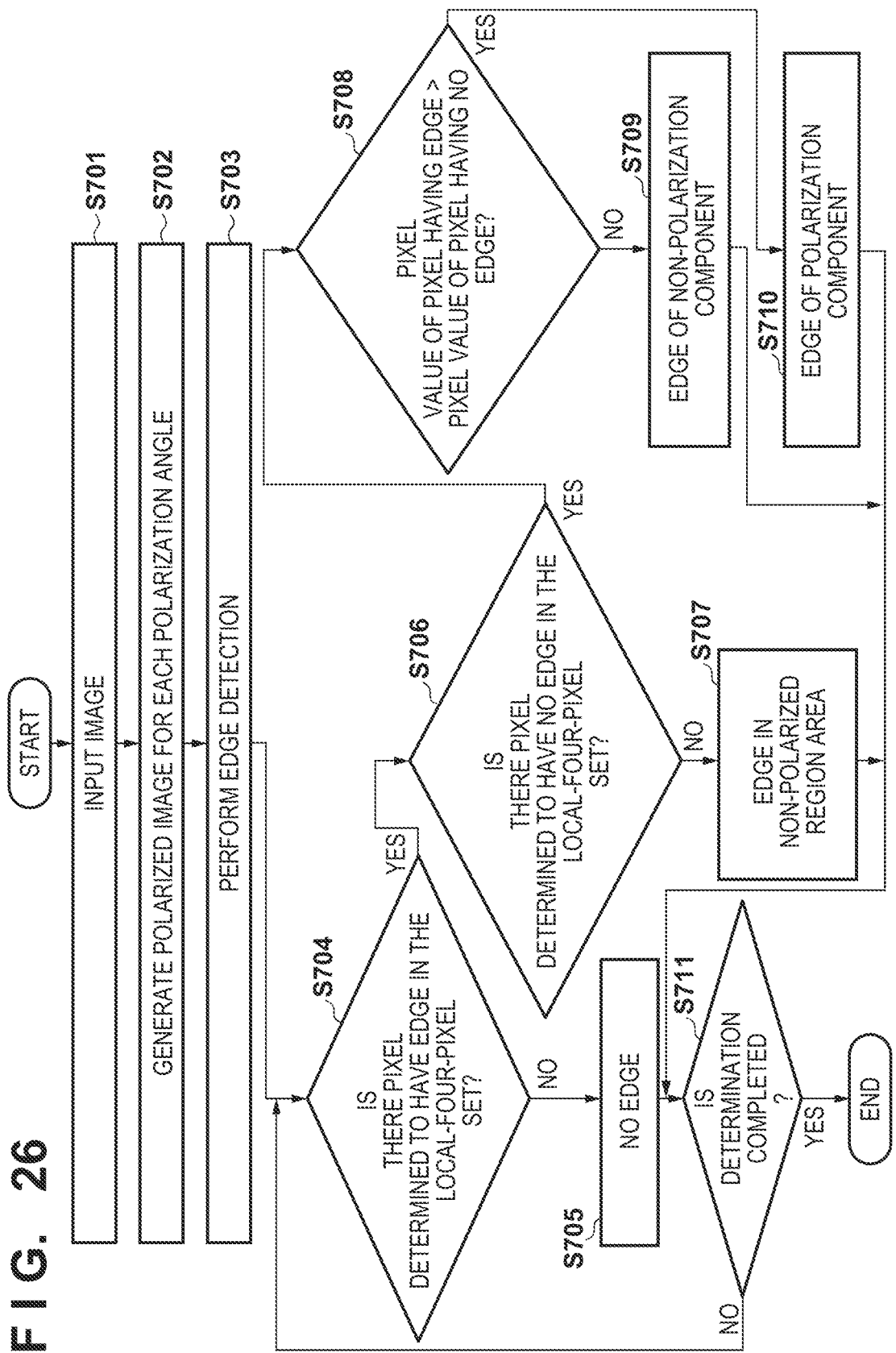
FIG. 26 is a flowchart showing a flow of edge discrimination processing according to the seventh embodiment.

A method for determining the type of edge in a polarized image in the above-described system will be described using the flowchart of FIG. 26. The processing shown in FIG. 26 is performed by the image sensor 101 through the edge determination unit 705 shown in FIG. 22.

First, in step S701, an image signal is acquired from the image sensor 101. Then, in step S702, the image generation unit 703 generates a plurality of polarized images of respective polarization angles from the image signal obtained in step S701.

Next, in step S703, the edge detection unit 704 performs edge detection on each of the polarized images generated in step S702.

Then, in step S704, the edge determination unit 705 determines whether there is a pixel determined to have an edge as a result of the edge detection processing performed in step S703 on the pixel signal output from the local-four-pixel set 710 shown in FIG. 23. If there is no pixel determined to have an edge, the local-four-pixel set 710 is determined to have no edge (step S705), and the process proceeds to step S711. If there is a pixel determined to have an edge, it is determined that an edge exists in the local-four-pixel set 710, and the process advances to step S706.

In step S706, it is determined whether or not there is a pixel for which an edge has not been detected among the pixels 714 to 717 included in the local-four-pixel set 710. If it is determined that edges have been detected in the pixels of all polarization angles (NO in step S706), the edge detected in the local-four-pixel set 710 is determined to be an edge in the non-polarized area (step S707), and the process proceeds to step S711. If it is determined that there is a pixel of any polarization angle having no edge, the edge existing in the local-four-pixel set 710 is determined to be an edge in the polarization region, and the process advances to step S708.

In step S708, among the pixels 714 to 717 included in the local-four-pixel set 710, the pixel value of the pixel of the polarization angle determined to have an edge is compared with the pixel value of the pixel of the polarization angle determined to have no edge. If the pixel value of the pixel of the polarization angle determined to have an edge is less than or equal to the pixel value of the pixel of a polarization angle determined to have no edge, it is determined that the edge existing in the local-four-pixel set 710 is an edge of a non-polarization component (step S709), and the process advances to step S711. On the other hand, if the pixel value of the pixel determined to have an edge is larger than the pixel value of the pixel determined to have no edge, the edge existing in the local-four-pixel set 710 is determined to be an edge of a polarization component (step S710), and the process advances to step S711.

In step S711, it is determined whether edge type determination processing has been performed for all local-four-pixel sets, and if there is an unprocessed local-four-pixel set, the process returns to step S704 and the above processing is performed for the next local-four-pixel set.

When the determination processing is completed for all local-four-pixel sets, the processing of the edge determination unit 705 is ended.

As described above, according to the seventh embodiment, by comparing edge detection results for each polarization angle, it is possible to determine whether there is an edge in a polarized image and the type of edge, it becomes possible to perform polarization reduction (correction processing) according to the subject or scene.

Eighth Embodiment

Next, an eighth embodiment of the present invention will be described.

Note that the configuration of the image capturing apparatus 100 in the eighth embodiment is the same as that shown in FIG. 1, so the description thereof will be omitted.

In the first embodiment, the representative polarization characteristics of the polarization reduction target area is calculated, and the polarization component is reduced while maintaining resolution by subtracting the correct amount of polarization component for each angle in the polarization reduction target area. However, in a case where different reflective surfaces are included in the polarization reduction target area, if the polarization component is uniformly reduced using the representative polarization characteristics in the statistical area, the polarization components will be well reduced in the reflective surfaces with the same characteristics as the representative polarization characteristics. However, if the reflective surface has characteristics different from the representative polarization characteristics, the polarization cannot be reduced sufficiently. That is, in the polarization reduction method based on the representative polarization characteristics in the statistical area, in order to perform good polarization reduction, it is desirable that polarization characteristics of most of the polarization reduction target area be the same as the representative polarization characteristics.

As an example, a polarization reduction method for an area including a windshield area 2701 and a side glass area 2702, such as the subject shown in FIG. 27, will be described below. The windshield area 2701 and the side glass area 2702 belong to different reflective surfaces. FIG. 28 shows a histogram of the polarization angle in a case where the statistical area is the combined area of the area 2701 and the area 2702. In the histogram of polarization angle, while the area 2701 has one peak 2801, the area 2702 has a peak 2802 that is different from the peak 2801 since the area 2701 and the area 2702 have different polarization angles. Thus, when a histogram of the polarization angle is created for a statistical area containing different polarization characteristics, a plurality of peaks appear.

Figure 27:
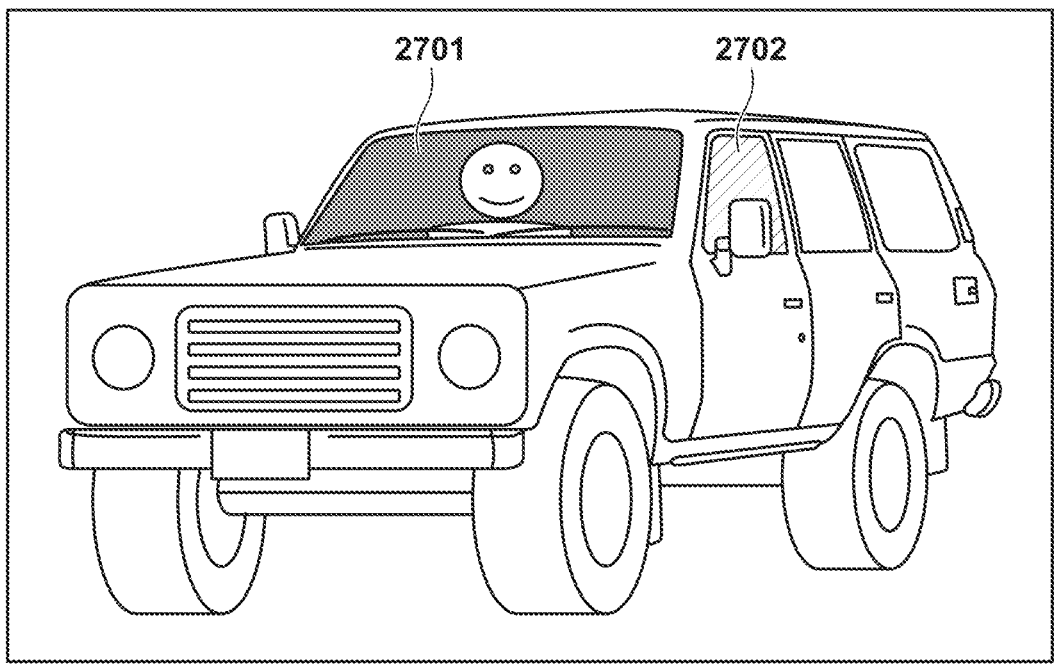
FIG. 27 is a diagram showing an example of a subject having a plurality of reflective surfaces according to the eighth embodiment.
Figure 28:
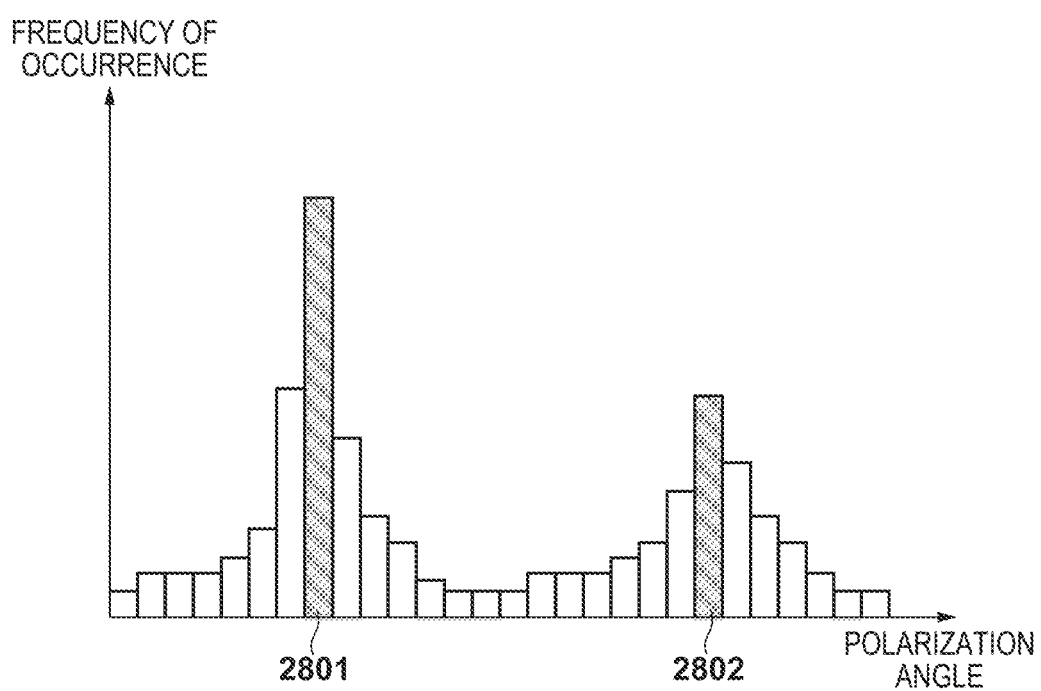
FIG. 28 is a diagram showing a histogram of polarization components in a case where the subject has the plurality of reflective surfaces according to the eighth embodiment.

In the example shown in FIG. 27, since the area of the area 2701 is wider than the area of the area 2702, the number of pixels included in the area 2701 is also greater than that in the area 2702, so that the polarization angle caused by the area 2701 occurs more frequently. If the mode is taken for this histogram of polarization angle, the peak corresponding to the area 2701 becomes the mode, and polarization can be reduced satisfactorily in the area 2701. On the other hand, since the polarization component is reduced from the area 2702 at a different polarization angle, the polarization component cannot be reduced sufficiently in the area 2702.

Figure 29:
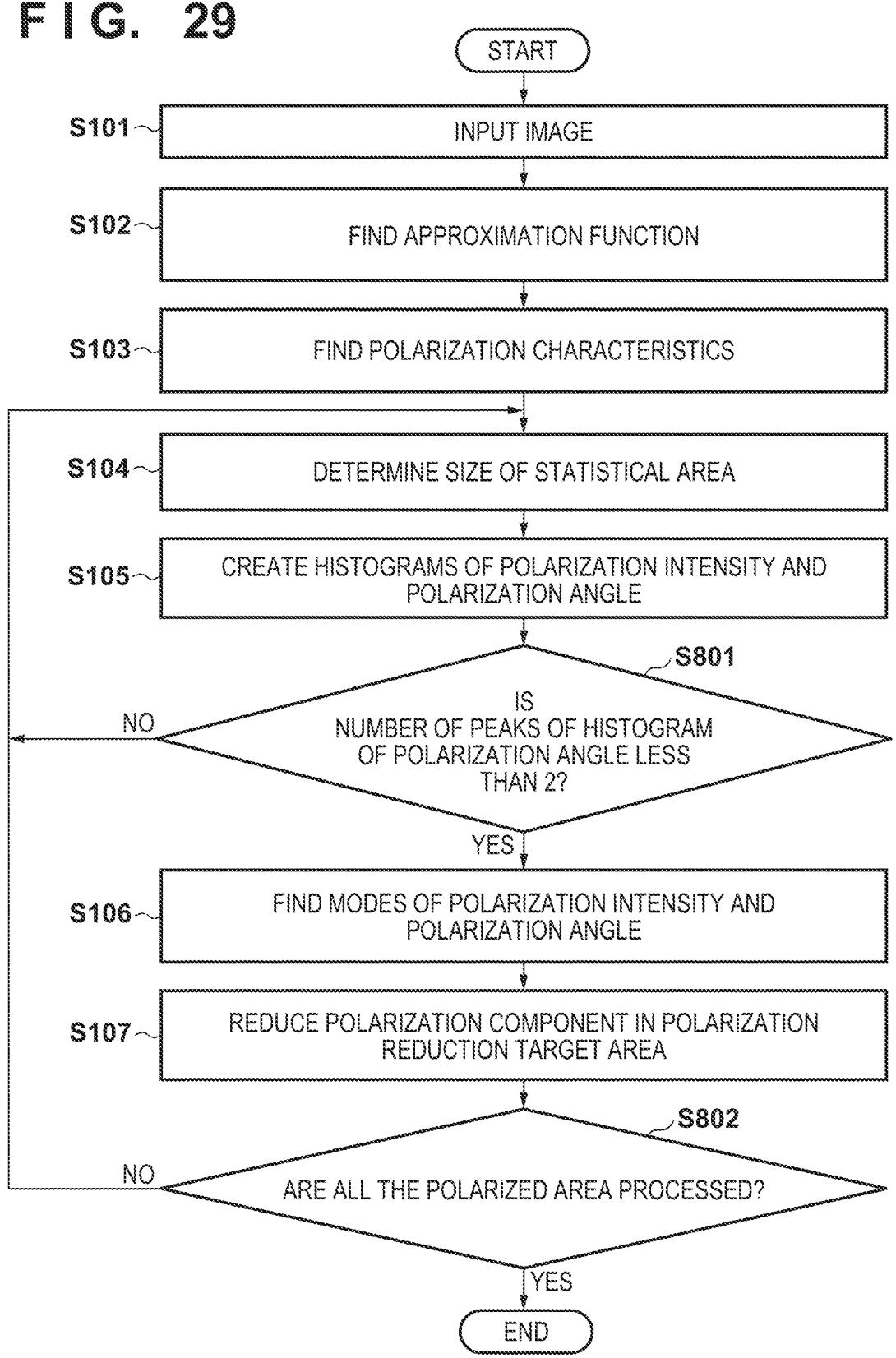
FIG. 29 is a flowchart showing a method for reducing a polarization component according to the eighth embodiment.

FIG. 29 is a flowchart showing processing for solving the above problem. Note that in FIG. 29, processes same as those in FIG. 7 are given the same reference numerals, and descriptions thereof will be omitted as appropriate.

In step S801, the polarization angle mode calculation unit 110 counts the number of peaks in the histogram of polarization angle generated by the polarization angle histogram generation unit 109, and determines the number of reflective surfaces included in the statistical area from the counted number of peaks. For example, if the number of peaks is 2, it is determined that two reflective surfaces with different polarization characteristics are included. If it is determined that there are a plurality of reflective surfaces, the process returns to step S104 and the size of the statistical area is determined again. At that time, the size of the statistical area is made smaller than the previously determined size. By repeating this, the statistical area is made up of one reflective surface. In step S106, the mode is obtained from the histogram of polarization intensity and polarization angle generated in the statistical area, and in step S107, polarization in the polarization reduction target area is reduced based on the obtained mode. Note that in this case, it is preferable that the statistical area and the polarization reduction target area are the same.

In step S802, it is determined whether polarization reduction processing has been performed for all polarized areas, and if there is an area for which polarization reduction has not been performed, the process returns to step S104 and the above processing is repeated for the corresponding area.

Note that in a real image, even if the reflective surface is uniform, multiple peaks may be formed in the histogram due to edges of the subject, edges of reflected light, noise, and the like. In that case, the number of peaks may be determined by smoothing the histogram or performing maximum likelihood estimation.

As described above, according to the eighth embodiment, even if the subject includes a plurality of reflective surfaces, polarization reduction (correction processing) can be performed satisfactorily.

Ninth Embodiment

Next, a ninth embodiment of the present invention will be described.

Note that the configuration of the image capturing apparatus 100 in the ninth embodiment is the same as that shown in FIG. 1, so the description thereof will be omitted.

Figure 30:
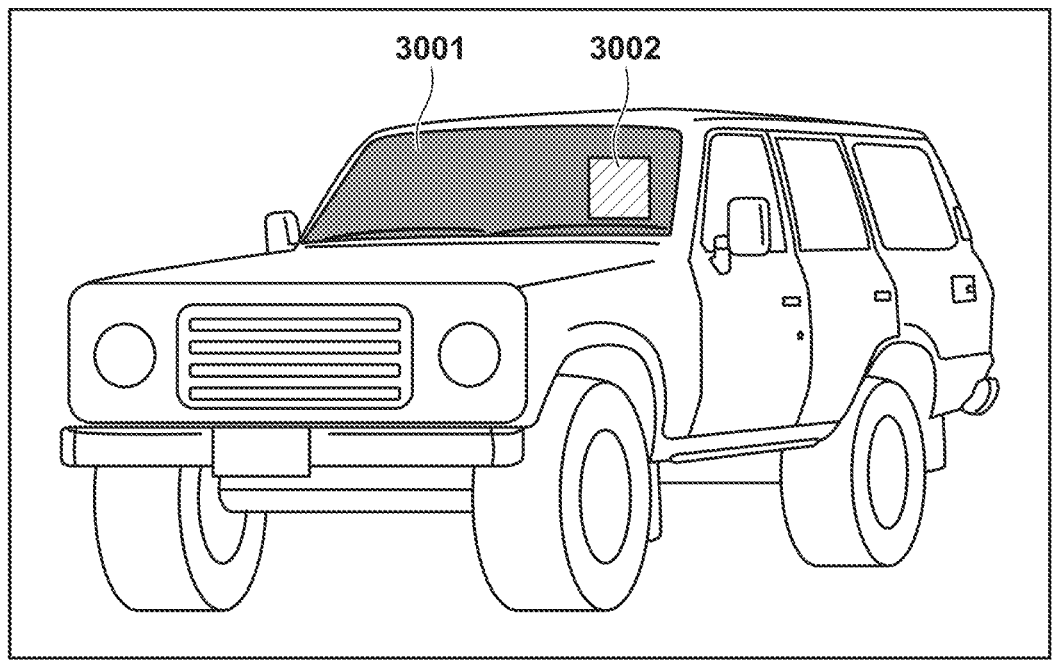
FIG. 30 is a diagram showing an example of a subject having a curved surface according to the ninth embodiment.
Figure 31A:
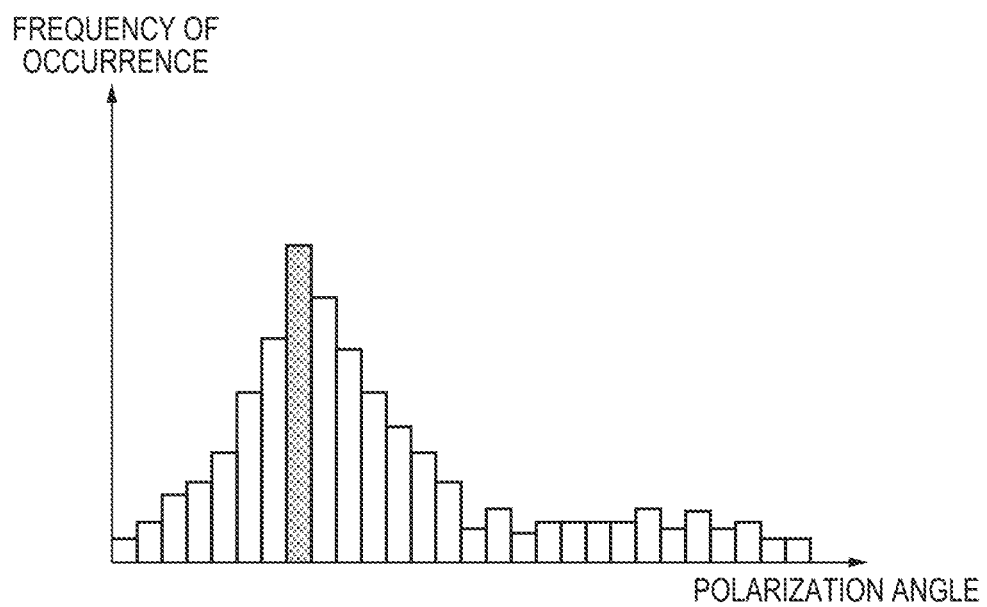
FIG. 31A is a diagram showing a histogram of polarization components in a case where the subject has a curved surface according to the ninth embodiment.

In the first embodiment, the polarization component is reduced while maintaining the resolution by calculating the representative polarization characteristics of the statistical area and subtracting the correct amount of polarization component from the luminance value for each polarization angle. However, when a curved surface is included in the statistical area, the shape of the histogram becomes gentle and polarization cannot be reduced sufficiently at the edges of the curved surface. For example, assume that the histogram of polarization angle created for the windshield area 3001 of FIG. 30 is shown in FIG. 31A. Since the windshield is a curved surface, the polarization angle calculated for each local-four-pixel set within the area 3001 is not uniform, and the shape of the histogram becomes gentle. In particular, the peripheral portion of the windshield, which have significantly different curvatures, have different polarization characteristics. Even if polarization reduction is performed based on the mode calculated from this histogram, good polarization reduction is not expected in areas away from an area corresponding to the peak of the histogram, particularly at the peripheral portion of the windshield.

Figure 32:
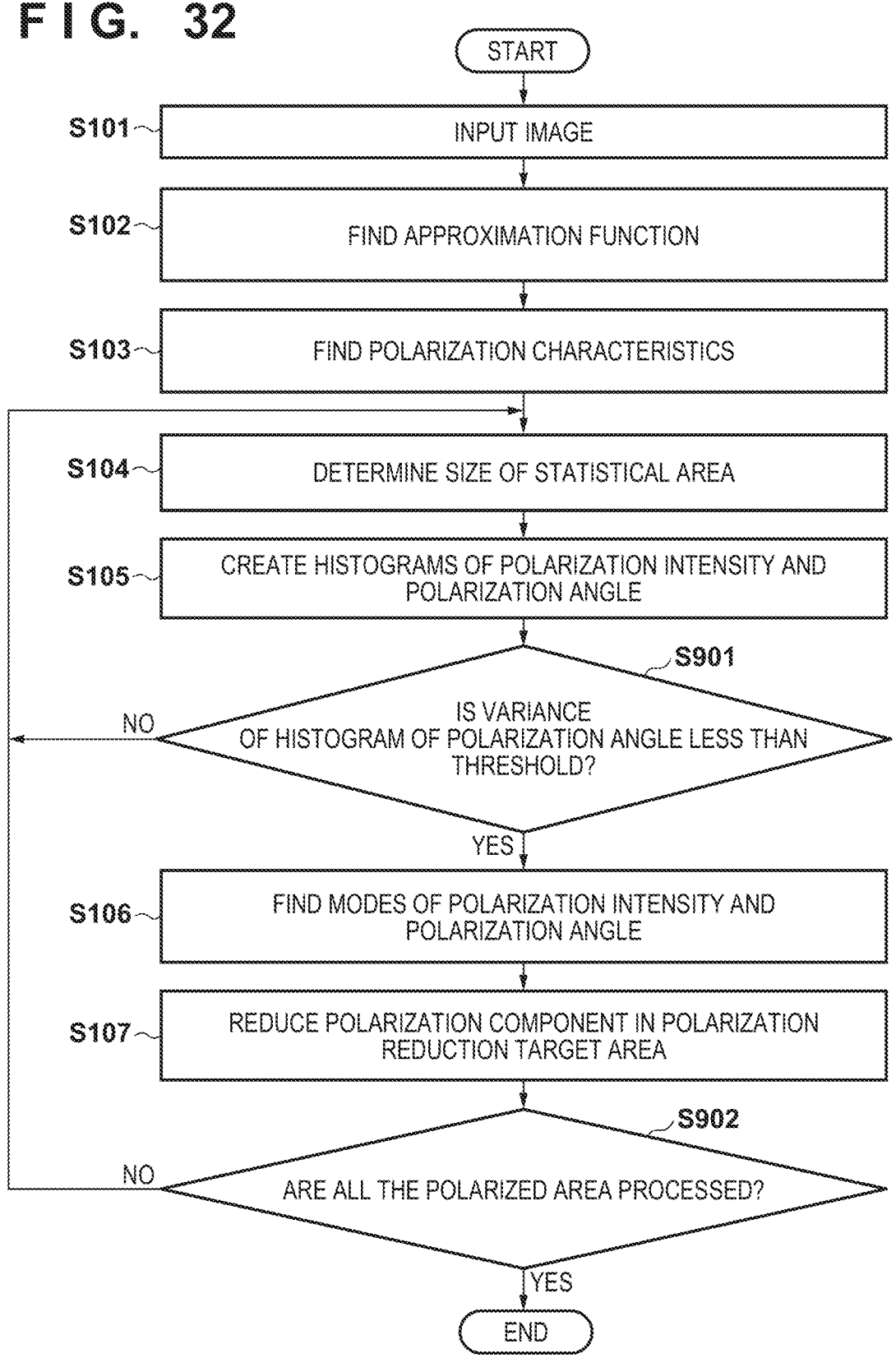
FIG. 32 is a flowchart showing a method for reducing a polarization component according to the ninth embodiment.

FIG. 32 is a flowchart showing processing in the ninth embodiment. Note that in FIG. 32, processes same as those in FIG. 7 are given the same reference numerals, and the descriptions thereof will be omitted as appropriate.

In step S901, the polarization angle mode calculation unit 110 compares the variance of the histogram of polarization angle generated by the polarization angle histogram generation unit 109 with a threshold, and if the variance of the histogram is equal to or greater than the threshold, it is determined that the statistical area includes a curved surface and the process returns to step S104, and the size of the statistical area is determined again. At this time, the statistical area is made smaller than the previously determined statistical area. By repeating this process, the statistical area will be made up of reflective surfaces with similar curvatures. In step S106, the modes of the histogram of polarization intensity and the histogram of polarization angle generated for the statistical area are obtained, and in step S107, polarization reduction in the polarization correction target area is performed based on the obtained mode. Note that in this case, it is preferable that the statistical area and the polarization reduction target area are the same.

Figure 31B:
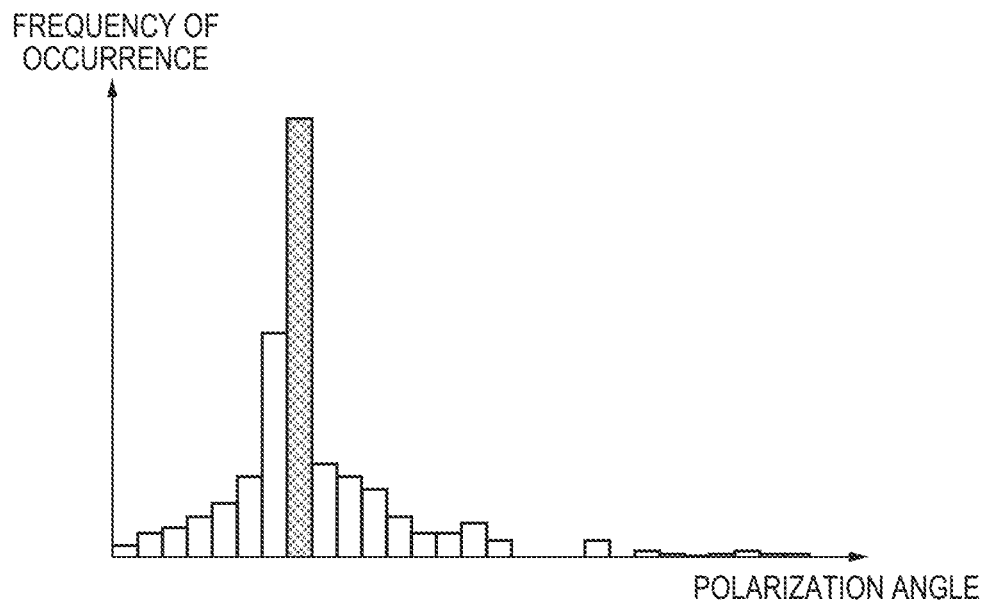
FIG. 31B is a diagram showing a histogram of the polarization components in a case where the subject has a curved surface according to the ninth embodiment.

The area 3002 shown in FIG. 30 is within the area 3001, and is small. A histogram of the polarization angle created for this area 3002 is shown in FIG. 31B. Although the area 3002 is also within a curved surface, there is no large difference in the curvature of the reflective surface within the area 3002, so the kurtosis of the histogram increases. In this way, in a case where the reflective surface is a curved surface, by narrowing the statistical area, the kurtosis of the histogram can be increased, and as a result, it becomes possible to perform good polarization reduction (correction processing).

In step S902, it is determined whether or not polarization reduction processing has been performed for all polarized areas, and if there is an area for which polarization removal has not been performed, the process returns to step S104 and the above processes are repeated for the corresponding area.

Note that in this embodiment, whether the statistical area includes a curved surface is determined by comparing the variance of the histogram of the polarization angle with a threshold, but whether the statistical area includes a curved surface may be determined from the spread of the histogram. For example, a probability distribution may be fitted by maximum likelihood estimation, and an index representing the dispersion or spread of the distribution may be used. Further, the threshold may be set arbitrarily.

Tenth Embodiment

Next, a tenth embodiment of the present invention will be described.

Note that the configuration of the image capturing apparatus 100 in the tenth embodiment is the same as that shown in FIG. 1, so the description thereof will be omitted.

Figure 33:
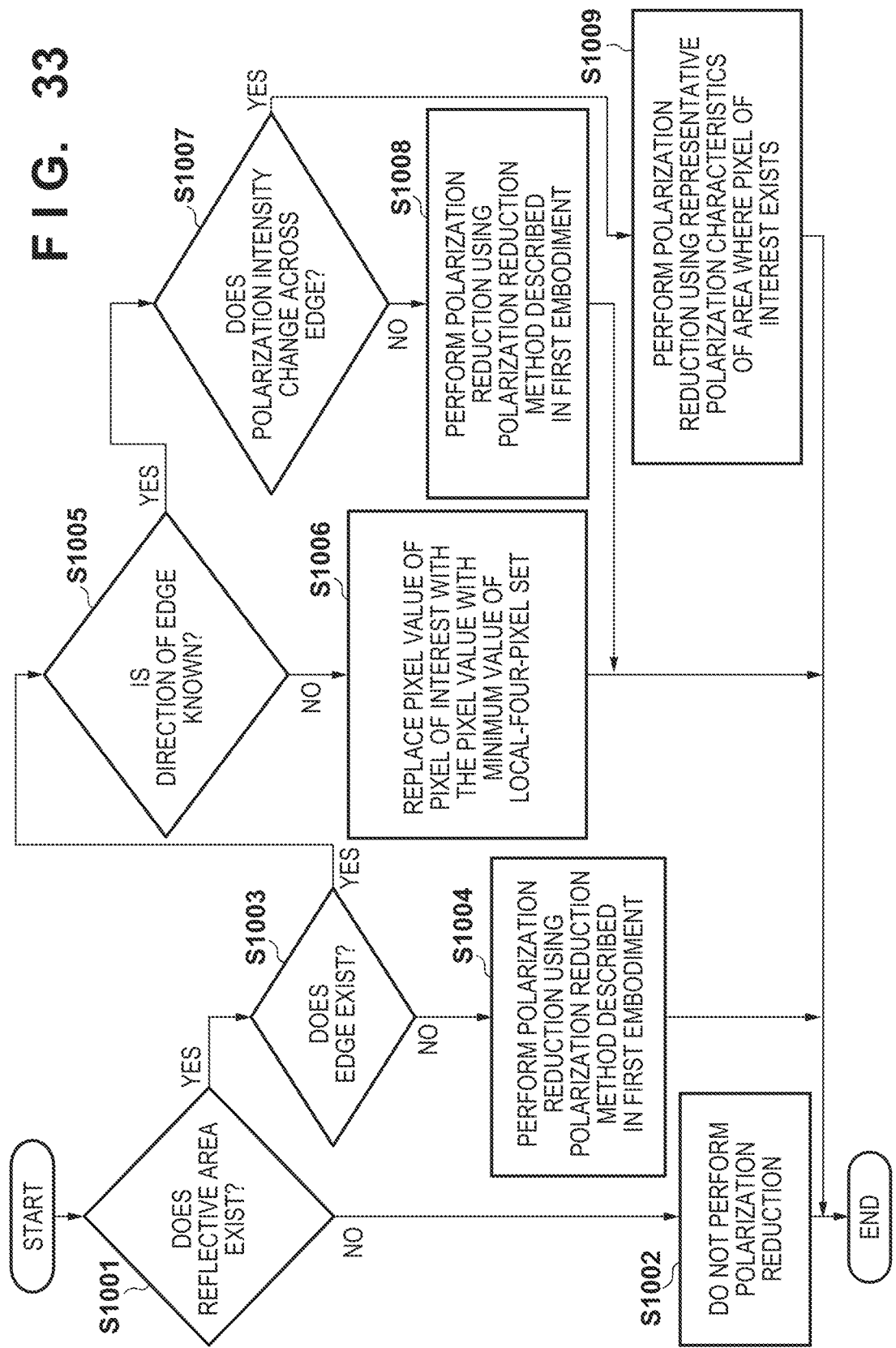
FIG. 33 is a flowchart showing a method for reducing a polarization component according to the tenth embodiment.

FIG. 33 is a flowchart showing a polarization component reduction method in the tenth embodiment.

In step S1001, the presence or absence of reflective area is determined in the polarization intensity mode calculation unit 107. If the histogram of polarization intensity obtained in the polarization intensity histogram generation unit 106 has a peak of polarization intensity that is greater than or equal to a predetermined threshold, it is determined that there is a reflective area, and the process advances to step S1003. If not, it is determined that there is no reflective area, the process advances to step S1002, and the process ends without performing polarization reduction.

In step S1003, the presence or absence of an edge is determined. If there is no edge, the process advances to step S1004, and polarization reduction is performed using the polarization reduction method described in the first embodiment. On the other hand, if there is an edge, the process advances to step S1005.

In step S1005, it is determined whether the direction of the edge is known. If the direction of the edge is not known, the process advances to step S1006, and if the direction of the edge is known, the process advances to step S1007.

In step S1006, the pixel value with the lowest level among the local-four-pixel set that includes the pixel of interest is used as the pixel value of the pixel of interest.

In step S1007, it is determined whether polarization intensity changes across the edge. If the polarization intensity does not change across the edge, the process advances to step S1008, and polarization reduction is performed using the polarization reduction method described in the first embodiment. If the polarization intensity changes across the edge, the process advances to step S1009.

In step S1009, polarization reduction is performed by reducing the polarization component of the pixel of interest using the representative polarization characteristics calculated for a plurality of local-four-pixel sets existing in the same area as the pixel of interest out of the areas divided by the edge.

Figure 34:
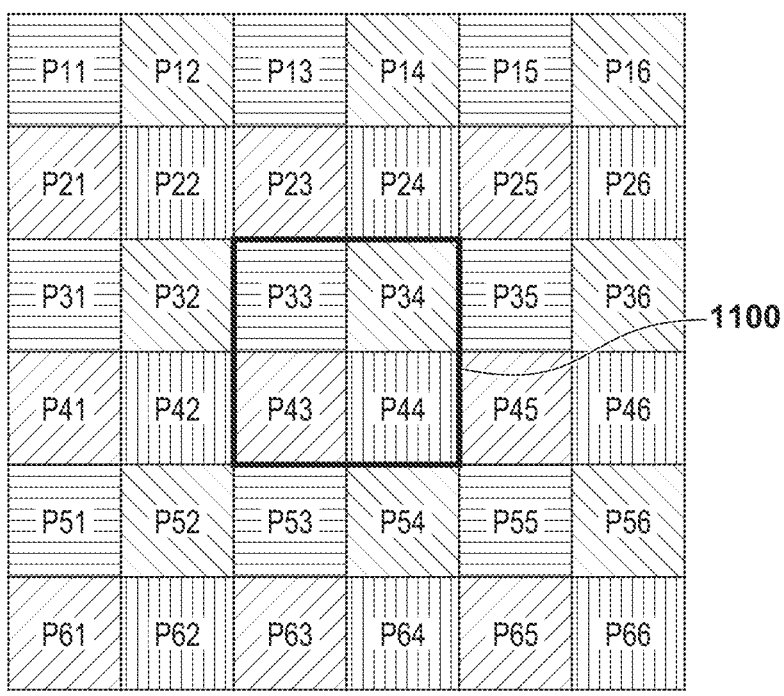
FIG. 34 is a diagram for explaining an edge determination method according to the tenth embodiment.
Figure 35A:
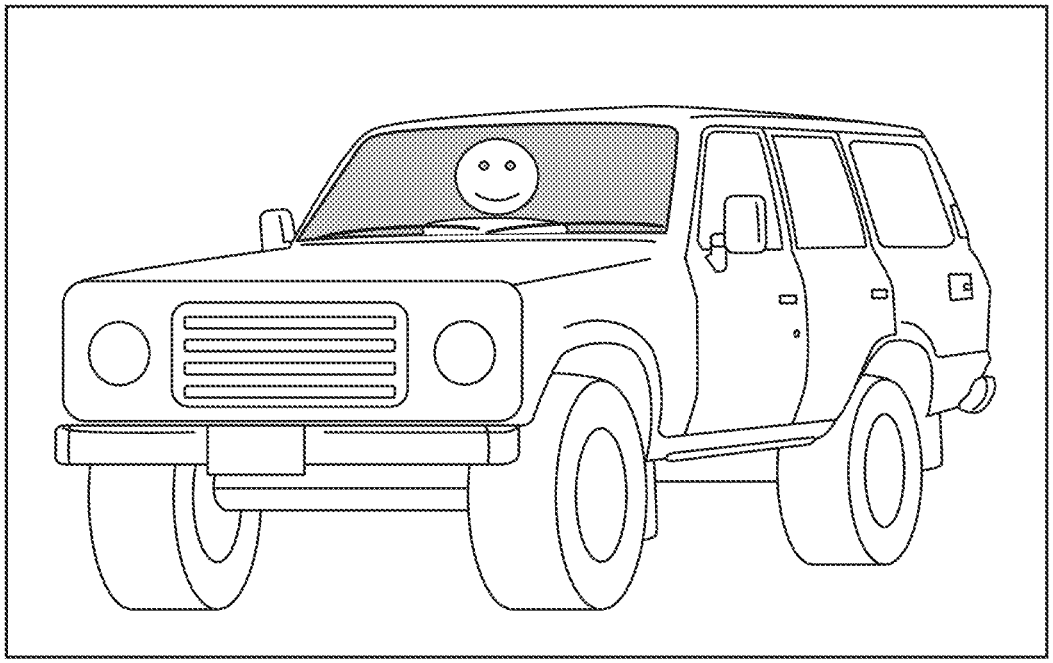
FIG. 35A is a diagram for explaining a problem.
Figure 35B:
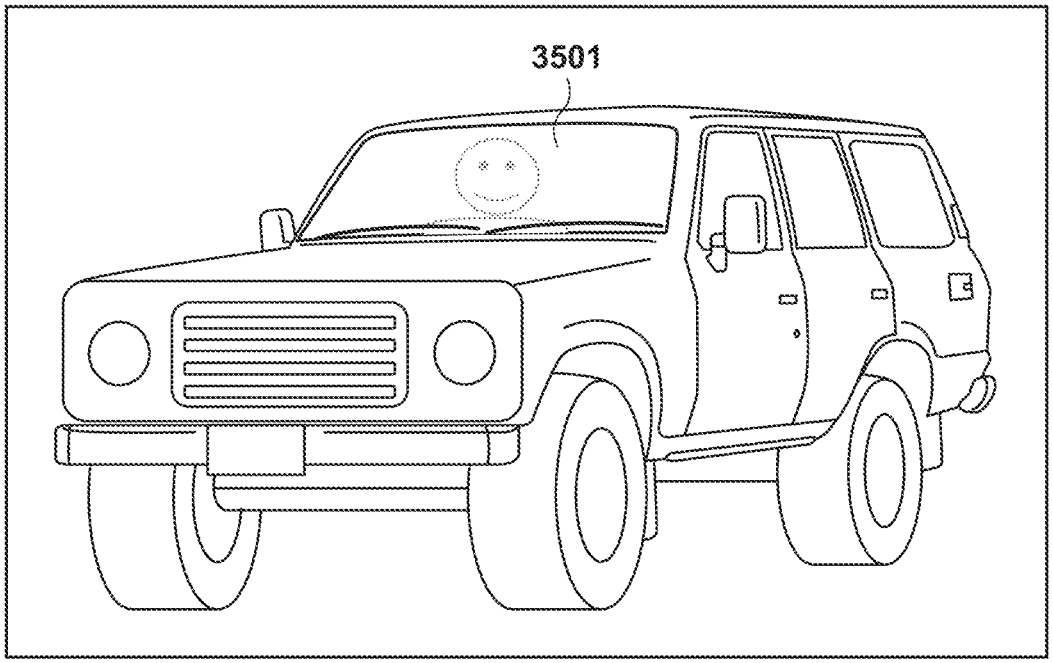
FIG. 35B is a diagram for explaining a problem.

FIG. 34 shows pixels referenced in edge determination in the tenth embodiment. The edge determination method in steps S1003, S1005, and S1007 will be explained using FIG. 34.

In the determination of the presence or absence of an edge in step S1003, first, the approximation function $F(\theta)$ of the polarization characteristics is determined using signals from pixels P33, P34, P43, and P44 in the local-four-pixel set 1100 to be determined. This is referred to as a first approximation function $F_1(\theta)$.

Next, using the upper and lower pixels P23, P24, P53, and P54 of the local-four-pixel set 1100, the approximation function $F(\theta)$ of the polarization characteristics is determined. This is referred to as a second approximation function $F_2(\theta)$.

Further, using the left and right pixels P32, P42, P35, and P45 of the local-four-pixel set 1100, the approximation function $F(\theta)$ of the polarization characteristics is determined. This is referred to as a third approximation function $F_3(\theta)$.

Furthermore, using pixels P22, P25, P52, and P55 that are diagonally adjacent to the local-four-pixel set 1100, the approximation function $F(\theta)$ of the polarization characteristic is determined. This is referred to as a fourth approximation function $F_4(\theta)$.

Then, the difference between the polarization angle of the first approximation function $F_1(\theta)$ and the polarization angle of the second approximation function $F_2(\theta)$ is defined as a first difference.

The difference between the polarization angle of the first approximation function $F_1(\theta)$ and the polarization angle of the third approximation function $F_3(\theta)$ is defined as a second difference.

If both of the first difference and the second difference is less than a predetermined threshold, it is determined in step S1003 that there is no edge, and if either the first difference or the second difference is greater than or equal to the predetermined threshold, it is determined in step S1003 that there is an edge.

For example, if the first difference is greater than or equal to the predetermined threshold and the second difference is less than the predetermined threshold, it is determined in step S1003 that there is an edge between the pixels P33, P34, P43, and P44 in the local-four-pixel set 1100. Furthermore, in this case, since the direction of the edge is the horizontal direction, it is determined in step S1005 that the direction of the edge is known.

Further, if the first difference is less than the predetermined threshold and the second difference is greater than or equal to the predetermined threshold, it is determined in step S1003 that there is an edge between the pixels P33, P34, P43, and P44 in the local-four-pixel set 1100. Furthermore, in this case, since the direction of the edge is the vertical direction, it is determined in step S1005 that the direction of the edge is known.

Furthermore, if both the first difference and the second difference are greater than or equal to the predetermined threshold, it is determined in step S1003 that there is an edge between the pixels P33, P34, P43, and P44 in the local-four-pixel set 1100, and it is determined in step S1005 that the direction of the edge is not known.

The method for determining the change in polarization intensity across the edge in step S1007 will be described below.

The polarization intensity of the pixels P13, P14, P23, and P24 included in another local-four-pixel set above the local-four-pixel set 1100 is defined as a first polarization intensity.

Similarly, the polarization intensity of pixels P31, P32, P41, and P42 included in another local-four-pixel set on the left of the local-four-pixel set 1100 is defined as a second polarization intensity.

Furthermore, the polarization intensity of pixels P35, P36, P45, and P46 included in another local-four-pixel set on the right of the local-four-pixel set 1100 is defined as a third polarization intensity.

Lastly, the polarization intensity of pixels P53, P54, P63, and P64 included in another local-four-pixel set below the local-four-pixel set 1100 is defined as a fourth polarization intensity.

In step S1007, if there is an edge between the pixels P33, P34, P43, and P44 in the local-four-pixel set 1100, and the difference between the first polarization intensity and the fourth polarization intensity is equal to or greater than a predetermined threshold, it is determined that there is a change in polarization intensity across the edge. If the difference between the first polarization intensity and the fourth polarization intensity is less than a predetermined threshold, it is determined that there is no change in polarization intensity across the edge.

Furthermore, if there is an edge between pixels P33, P34, P43, and P44 in the local-four-pixel set 1100, and the difference between the second polarization intensity and the third polarization intensity is greater than or equal to a predetermined threshold, it is determined that there is a change in polarization intensity across the edge. If the difference between the second polarization intensity and the third polarization intensity is less than a predetermined threshold, it is determined that there is no change in polarization intensity across the edge.

As explained above, in the tenth embodiment, by subtracting the polarization component calculated from the representative polarization characteristics from the luminance value of each pixel, it is possible to generate an image from which the polarization is reduced (correction processing) without lowering the resolution. In addition, by determining an edge using surrounding pixels and switching the polarization reduction method, it is possible to appropriately reduce polarization (correction processing) even for pixels that include an edge of a non-polarization component and an edge of a polarization component.

According to the present invention, it is possible to perform more accurate polarization reduction processing by using a plurality of image signals corresponding to light having different polarization characteristics obtained in one shot.

Other Embodiments

Note that the present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising one or more processors and/or circuitry which function as:
    an input unit that inputs an image signal generated by photoelectrically converting a plurality of polarized lights with different polarization angles from each other;
    a first processing unit that finds, for each set of a plurality of image signals corresponding to the polarized lights, a maximum value of polarization intensities of polarization components of the plurality of image signals and a polarization angle at which the maximum value of the polarization intensities is obtained;
    a setting unit that finds a target area to which polarization reduction is to be applied based on the image signal and sets a statistical area, included in the target area, for taking statistics;
    a second processing unit that finds a representative intensity which is a mode of the polarization intensities and a representative angle which is a mode of pluralization angles of the sets included in the statistical area; and
    a correction unit that performs first correction processing for correcting each image signal of the sets included in the target area using the representative intensity and the representative angle according to the polarization angle of the each image signal.

2. The image processing apparatus according to claim 1, wherein the setting unit
    divides the target area into an area where a difference between a maximum value and a minimum value of the image signals in each set is equal to or greater than a first threshold, and an area where the difference is smaller than the first threshold, and
    sets an arbitrary area of the area where the difference is equal to or greater than the first threshold as the statistical area.

3. The image processing apparatus according to claim 1, wherein the second processing unit generates a histogram of polarization intensity and a histogram of polarization angle of the sets included in the statistical area, and finds modes of the histograms.

4. The image processing apparatus according to claim 1, wherein the first processing unit finds an approximation function $F(\theta)$ for each set, $$F(\theta)=A\cos(2\theta+2B)+C$$

where $\theta$ is an angle, A is a polarization intensity of a polarization component, B is a polarization angle of the polarization component, and C is an offset component, and
    the first processing unit defines A as the polarization intensity, and $\theta$ at which $F(\theta)$ becomes the maximum value as the polarization angle.

5. The image processing apparatus according to claim 1, wherein the correction unit finds an approximation function $F(\theta)$, $$F(\theta)=Imode\cdot\cos(2\theta+2\theta mode)+C$$

where Imode is the representative intensity, $\theta$mode is the representative angle, and C is an offset component, and
    the polarization component of each polarization angle is calculate by substituting the polarization angle of the polarized light to $\theta$.

6. The image processing apparatus according to claim 1, wherein the one or more processors and/or circuitry further functions as a synthesis unit,
    the second processing unit generates a histogram of polarization intensity and a histogram of polarization angle of the sets included in the statistical area,
    in a case where one peak exists in the histogram of polarization intensity, the correction unit performs the first correction processing,
    in a case where a plurality of peaks exist in the histogram of polarization intensity, the correction unit performs second correction processing, and
    the second correction processing is processing that the setting unit repeats a first process of changing size and position of the statistical area and a second process of generating the histogram of polarization intensity and the histogram of polarization angle of the sets included in the statistical area changed by the second processing unit a predetermined number of times, the correction unit performs correction using representative intensity and representative angle obtained based on the modes of the histogram of polarization intensity and the histogram of polarization angle generated by the second process, and the synthesis unit synthesizes a plurality of corrected image signals obtained through the second process.

7. The image processing apparatus according to claim 1, wherein the second processing unit generates a histogram of polarization intensity and a histogram of polarization angle of the sets included in the statistical area, in a case where one peak exists in the histogram of polarization intensity, the second processing unit finds the representative intensity and the representative angle, and the correction unit performs the first correction processing, and in a case where a plurality of peaks exist in the histogram of polarization intensity, the second processing unit does not find the representative intensity and the representative angle, and the correction unit performs third correction processing that corrects image signal in the target area using the polarization intensity and the polarization angle of each set found by the first processing unit according to the polarization angle.

8. The image processing apparatus according to claim 6, wherein, in a case where a peak of the histogram of polarization intensity is not discriminated, the second processing unit re-generates the histogram of polarization intensity using the polarization intensities of the sets having polarization angles within a predetermined range with respect to the representative angle from among polarization intensities of the sets included in the statistical area.

9. The image processing apparatus according to claim 7, wherein, in a case where a peak of the histogram of polarization intensity is not discriminated, the second processing unit re-generates the histogram of polarization intensity using the polarization intensities of the sets having polarization angles within a predetermined range with respect to the representative angle from among polarization intensities of the sets included in the statistical area.

10. The image processing apparatus according to claim 1, wherein the correction unit compares an intensity difference between the representative intensity and the polarization intensity of each set with a predetermined third threshold and compares an angular difference between the representative angle and the polarization angle of each set with a predetermined fourth threshold, for the set with the intensity difference being less than the third threshold and the angular difference being less than the fourth threshold, the correction unit performs the first correction processing, and for the set with at least the intensity difference being equal to or greater than the third threshold or the angular difference being equal to or greater than the fourth threshold, the first processing unit changes a combination of image signals that constitute the set.

11. The image processing apparatus according to claim 10, wherein the first processing unit repeats a first process that finds a polarization intensity and a polarization angle of a new set for which the combination of image signals is changed from the set with at least the intensity difference being equal to or greater than the third threshold or the angular difference being equal to or greater than the fourth threshold, and the correction unit repeats a second process that compares for each new set the intensity difference and the angular difference with the third threshold and the fourth threshold, respectively, until the intensity difference and the angular difference becomes less than the third threshold and the fourth threshold, respectively.

12. The image processing apparatus according to claim 10, wherein in a case where the image signal holds color information, the first processing unit performs a process of adjusting intensities of image signals of the new set in which the combination of image signals are changed to an intensity of an image signal of a predetermined color, and finds the polarization intensity and the polarization angle using the adjusted image signals.

13. The image processing apparatus according to claim 6, wherein the one or more processors and/or circuitry further functions as:

a detection unit that detects presence/absence of an edge in each set, and a determination unit that determines the type of the edge in a case where the edge is detected by the detection unit, wherein in a case where the edge determined by the determination unit is an edge of a non-polarization component existing in the target area, the correction unit performs the first correction processing, and in a case where the edge is an edge of a polarization component, the correction unit performs the second correction processing.

14. The image processing apparatus according to claim 1, wherein the second processing unit generates a histogram of polarization intensity and a histogram of polarization angle of the sets included in the statistical area, in a case where one peak exists in the histogram of polarization angle, the correction unit performs the first correction processing, and in a case where a plurality of peaks exist in the histogram of polarization angle, the setting unit performs a first process of reducing a size of the statistical area and the second processing unit performs a second process of generating the histogram of polarization intensity and the histogram of polarization angle of the sets included in the changed statistical area, and the first process and the second process are repeated until the histogram of polarization angle becomes to have one peak, and the correction unit corrects each image signal of the sets included in the changed statistical area using a representative intensity and a representative angle of the changed statistical area according to a polarization angle of the each image signal.

15. The image processing apparatus according to claim 1, wherein the second processing unit generates a histogram of polarization intensity and a histogram of polarization angle of the set included in the statistical area, in a case where a shape of the histogram of polarization angle satisfies a predetermined condition, the correction unit performs the first correction processing, and in a case where the shape of the histogram of polarization angle does not satisfy the predetermined condition, the setting unit performs a first process of reducing a size of the statistical area and the second processing unit performs a second process of generating the histogram of polarization intensity and the histogram of polarization angle of the sets included in the changed statistical area, and the first process and the second process are repeated until the shape of the histogram of polarization angle generated in the second process becomes to satisfy the condition, and the correction unit corrects each image signal of the sets included in the changed statistical area using a representative intensity and a representative angle of the changed statistical area according to a polarization angle of the each image signal.

16. The image processing apparatus according to claim 15, wherein the condition is that a variance of the histogram of polarization angle is less than a predetermined threshold or an index indicating variation or spread of distribution obtained by fitting the histogram of polarization angle to a probability distribution using maximum likelihood estimation is less than a predetermined variation or distribution.

17. The image processing apparatus according to claim 1, wherein the one or more processors and/or circuitry further functions as a detection unit that detects presence/absence of an edge in each set,
the correction unit
performs the first correction processing in a case where no edge is detected by the detection unit and in a case where an edge is detected and polarization intensities do not change across the edge,
replaces a pixel signal to be corrected by a minimum value of the set that includes the pixel signal in a case where an edge is detected and a direction of the edge is not known, and
corrects a luminance value of a pixel signal to be corrected using a representative intensity and a representative angle of a plurality of sets in an area to which the pixel signal belongs according to a polarization angle of the pixel signal to be corrected in a case where an edge is detected and polarization intensities are different across the edge.

18. The image processing apparatus according to claim 17, wherein the detection unit detects presence/absence of an edge based on polarization intensities of pixels around the set calculated using an approximation function representing polarization characteristics.

19. The image processing apparatus according to claim 17, wherein the detection unit detects the direction of an edge based on polarization angles of pixels around the set calculated using an approximation function representing polarization characteristics.

20. An image capturing apparatus comprising:
an image sensor, having a plurality of polarizing filters that pass a plurality of polarized lights with different polarization angles each other, that generates an image signal generated by photoelectrically converting the plurality of polarized lights; and
an image processing apparatus comprising one or more processors and/or circuitry which function as:
an input unit that inputs the image signal from the image sensor;
a first processing unit that finds, for each set of a plurality of image signals corresponding to the polarized lights, a maximum value of polarization intensities of polarization components of the plurality of image signals and a polarization angle at which the maximum value of the polarization intensities is obtained;
a setting unit that finds a target area to which polarization reduction is to be applied based on the image signal and sets a statistical area, included in the target area, for taking statistics;
a second processing unit that finds a representative intensity which is a mode of the polarization intensities and a representative angle which is a mode of pluralization angles of the sets included in the statistical area; and
a correction unit that performs first correction processing for correcting each image signal of the sets included in the target area using the representative intensity and the representative angle according to the polarization angle of the each image signal.

21. The image capturing apparatus according to claim 20, wherein the image sensor is covered with color filters of a plurality of colors, and the color filters of the same color are provide on a plurality of pixels corresponding to each set.

22. The image capturing apparatus according to claim 20, wherein the plurality of pixels corresponding to each set are exposed using a plurality of different exposure conditions, and
the image processing apparatus further comprises one or more processors and/or circuitry which function as
a conversion unit that adjusts an image signal according to the exposure condition of the image signal of each pixel input through the input unit; and
a synthesis unit that performs synthesizing processing for expanding a dynamic range,
wherein the image processing apparatus processes the adjusted image signals, and the synthesis unit uses image signals from which the polarization components are reduced to perform the synthesizing processing.

23. An image processing method comprising:
inputting an image signal generated by photoelectrically converting a plurality of polarized lights with different polarization angles from each other;
finding, for each set of a plurality of image signals corresponding to the polarized lights, a maximum value of polarization intensities of polarization components of the plurality of image signals and a polarization angle at which the maximum value of the polarization intensities is obtained;
finding a target area to which polarization reduction is to be applied based on the image signal and setting a statistical area, included in the target area, for taking statistics;
finding a representative intensity which is a mode of the polarization intensities and a representative angle which is a mode of pluralization angles of the sets included in the statistical area; and
performing first correction processing for correcting each image signal of the sets included in the target area using the representative intensity and the representative angle according to the polarization angle of the each image signal.

24. A non-transitory computer-readable storage medium, the storage medium storing a program that is executable by the computer, wherein the program includes program code for causing the computer to function as an image processing apparatus comprising:
an input unit that inputs an image signal generated by photoelectrically converting a plurality of polarized lights with different polarization angles from each other;
a first processing unit that finds, for each set of a plurality of image signals corresponding to the polarized lights, a maximum value of polarization intensities of polarization components of the plurality of image signals and a polarization angle at which the maximum value of the polarization intensities is obtained;
a setting unit that finds a target area to which polarization reduction is to be applied based on the image signal and sets a statistical area, included in the target area, for taking statistics;
a second processing unit that finds a representative intensity which is a mode of the polarization intensities and a representative angle which is a mode of pluralization angles of the sets included in the statistical area; and
a correction unit that performs first correction processing for correcting each image signal of the sets included in the target area using the representative intensity and the representative angle according to the polarization angle of the each image signal.

* * * * *